US012593937B2

(12) United States Patent
Starr et al.

(10) Patent No.: US 12,593,937 B2
(45) Date of Patent: Apr. 7, 2026

(54) MULTI-FUNCTIONAL OVEN WITH AIR FRYER CAPABILITY

(71) Applicant: Hamilton Beach Brands, Inc., Glen Allen, VA (US)

(72) Inventors: William D Starr, Richmond, VA (US); Lynda Musante, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 627 days.

(21) Appl. No.: 16/926,024

(22) Filed: Jul. 10, 2020

(65) Prior Publication Data

US 2022/0007888 A1     Jan. 13, 2022

(51) Int. Cl.
*A47J 37/06* (2006.01)
*A47J 36/32* (2006.01)

(52) U.S. Cl.
CPC ........... *A47J 37/0641* (2013.01); *A47J 36/32* (2013.01); *A47J 37/0664* (2013.01)

(58) Field of Classification Search
CPC ................ A47J 37/0754; A47J 37/0623; A47J 37/0629; A47J 36/32; A47J 36/36; A47J 36/34; A47J 37/0641; A47J 37/0635; A47J 37/0664; A21B 1/24; A21B 1/26; F24C 7/085
USPC .................. 99/327, 331–332, 339, 476, 474; 392/360–361; 219/400, 395, 396, 398, 219/409, 402–405, 385, 391
See application file for complete search history.

(56) References Cited

U.S. PATENT DOCUMENTS

| | | | | |
|---|---|---|---|---|
| 2,352,590 A | * | 6/1944 | Trinkle | A23B 4/16 99/476 |
| 4,126,087 A | * | 11/1978 | McLamb | A47J 37/06 99/467 |
| 5,468,935 A | * | 11/1995 | Wang | F24C 15/322 219/400 |
| 5,717,192 A | | 2/1998 | Dobie et al. | |
| 5,967,027 A | * | 10/1999 | Higashimoto | A23B 4/044 99/534 |
| 8,950,319 B2 | | 2/2015 | Nam et al. | |
| 9,006,619 B2 | | 4/2015 | McNamee et al. | |

(Continued)

FOREIGN PATENT DOCUMENTS

| | | |
|---|---|---|
| EP | 0653900 | 7/1999 |
| WO | WO1994018839 | 9/1994 |

*Primary Examiner* — Helena Kosanovic
*Assistant Examiner* — Bonita Khlok
(74) *Attorney, Agent, or Firm* — Alexander D. Raring

(57) ABSTRACT

A multi-functional oven includes: a housing having a floor, a rear wall, a ceiling, and first and second side walls; a door that serves as a front wall of the housing; an internal side wall that divides the housing into a cooking cavity and an control cavity; a removable cooking rack that defines a cooking surface; a lower heating element positioned in a lower region of the cooking cavity beneath the cooking surface; an upper heating element positioned in an upper region of the cooking cavity above the cooking surface; and a fan residing in a recirculation duct in the control cavity configured to draw air from the cooking cavity through lower vents located in a lower area of the internal side wall, thereby creating an airstream above and below the cooking surface that flows into the lower vents, and to force air from the control cavity through upper vents into the cooking cavity.

17 Claims, 21 Drawing Sheets

(56)                    References Cited

U.S. PATENT DOCUMENTS

| | | | | |
|---|---|---|---|---|
| 10,119,708 | B2 | 11/2018 | Bartelick et al. | |
| 10,561,277 | B1 * | 2/2020 | Swayne | A23L 5/17 |
| 10,905,281 | B2 * | 2/2021 | Delrue | A47J 37/0641 |
| 2002/0092842 | A1 | 7/2002 | Loveless | |
| 2003/0024925 | A1 | 2/2003 | Graves et al. | |
| 2004/0035845 | A1 * | 2/2004 | Moon | F24C 15/006 |
| | | | | 219/400 |
| 2005/0087524 | A1 * | 4/2005 | Zhang | A47J 39/003 |
| | | | | 219/400 |
| 2006/0137675 | A1 * | 6/2006 | Kim | F24C 15/325 |
| | | | | 126/21 A |
| 2008/0121635 | A1 * | 5/2008 | Lee | H05B 6/6473 |
| | | | | 219/681 |
| 2008/0149088 | A1 * | 6/2008 | Inada | F24C 15/327 |
| | | | | 126/21 R |
| 2008/0213447 | A1 * | 9/2008 | Payen | A47J 37/0641 |
| | | | | 219/385 |
| 2012/0079948 | A1 * | 4/2012 | Nam | H05B 6/6476 |
| | | | | 99/331 |
| 2015/0201806 | A1 * | 7/2015 | Yoshidome | A47J 27/004 |
| | | | | 99/447 |
| 2016/0029829 | A1 * | 2/2016 | Klein | A47J 37/08 |
| | | | | 99/332 |
| 2019/0000267 | A1 * | 1/2019 | Li | A47J 37/0641 |
| 2020/0187711 | A1 * | 6/2020 | De' Longhi | A47J 37/0664 |

* cited by examiner

MULTI-FUNCTIONAL OVEN WITH AIR FRYER CAPABILITY

FIELD OF THE INVENTION

The present invention is directed generally to cooking appliances, and more specifically to multi-functional oven cooking appliances.

BACKGROUND

Various toaster-ovens exist for heating and cooking a variety of food items. For example, existing toaster ovens are used for toasting bagels, heating sandwiches, baking desserts, broiling meats and reheating leftovers. Heating and cooking these food items is often accomplished by the operation of upper and lower heating elements within the toaster oven, and temperature control and time control over these heating elements through a user interface or control panel.

In addition, air fryers are a relatively new innovation in home cooking. Traditionally, deep fat fryers have been used to cook French fries and numerous other food products (e.g., chicken, fish, onion rings). These food products can be prepared from frozen, refrigerated, ambient, or above ambient temperature conditions. Some consumers place a high value on healthier foods that are prepared using less oils or fats, and the replacement of the deep fat frying process with air frying eliminates a significant amount of oil and fat absorption into the food product. But, while consumers desire healthier foods prepared with less fat and oil, they still desire the taste, texture and mouth feel associated with the deep fat frying process.

It may be desirable to provide a single appliance that is capable of both typical toaster-oven and air fryer functionality and in doing so provide the crispness and texture typically associated with each cooking method.

SUMMARY

As a first aspect, embodiments of the invention are directed to a multi-functional oven, and in particular a multi-functional oven with conventional toasting/cooking and air frying modes. The oven comprises: a housing having a floor, a rear wall, a ceiling, and first and second side walls; a door that serves as a front wall of the housing; an internal side wall that divides the housing into a cooking cavity and an control cavity; a removable cooking rack that defines a cooking surface; a lower heating element positioned in a lower region of the cooking cavity beneath the cooking surface; an upper heating element positioned in an upper region of the cooking cavity above the cooking surface; and a fan residing in a recirculation duct in the control cavity. The fan is configured to draw air from the cooking cavity through one or more lower vents located in a lower area of the internal side wall, thereby creating an airstream below the cooking surface that flows into the lower vents, and to force air from the control cavity through upper vents into the cooking cavity.

As a second aspect, embodiments of the invention are directed to a multi-functional oven, comprising: a housing having a floor, a rear wall, a ceiling, and first and second side walls; a door that serves as a front wall of the housing; an internal side wall that divides the housing into a cooking cavity and an control cavity; a removable cooking rack that defines a cooking surface; a lower heating element positioned in a lower region of the cooking cavity beneath the cooking surface; an upper heating element positioned in an upper region of the cooking cavity above the cooking surface; and a fan residing in a recirculation duct in the control cavity. The fan is configured to draw air from the cooking cavity into the control cavity through one or more vents in the internal side wall, and to exhaust air from the control cavity into the cooking cavity. The oven further includes a vent located in the control cavity configured to open at a predetermined pressure and to exhaust a portion of the air drawn into the control cavity prior to the exhausting of air into the cooking cavity.

As a third aspect, embodiments of the invention are directed to a multi-functional oven comprising: a housing having a floor, a rear wall, a ceiling, and first and second side walls; a door that serves as a front wall of the housing; an internal side wall that divides the housing into a cooking cavity and an control cavity; a removable cooking rack that defines a cooking surface; a lower heating element positioned in a lower region of the cooking cavity beneath the cooking surface; an upper heating element positioned in an upper region of the cooking cavity above the cooking surface; a supplemental heating element; a fan residing in a recirculation duct in the control cavity, the fan configured to draw air from the cooking cavity into the control cavity through one or more vents in the internal side wall, and to exhaust air from the control cavity into the cooking cavity; and a controller operatively associated with the lower, upper and supplemental heating elements, the controller configured to activate only the lower and upper heating elements in a first cooking mode, and to activate the lower, upper and supplemental heating elements in a second cooking mode.

As a fourth aspect, embodiments of the invention are directed to a cooking rack comprising: a frame having longitudinal runners; a pan mounted to the frame; and heat shields mounted to the longitudinal runners and configured and positioned to prevent drippings from the pan to reach heating elements located beneath the heat shields.

DETAILED DESCRIPTION

Figure 1:
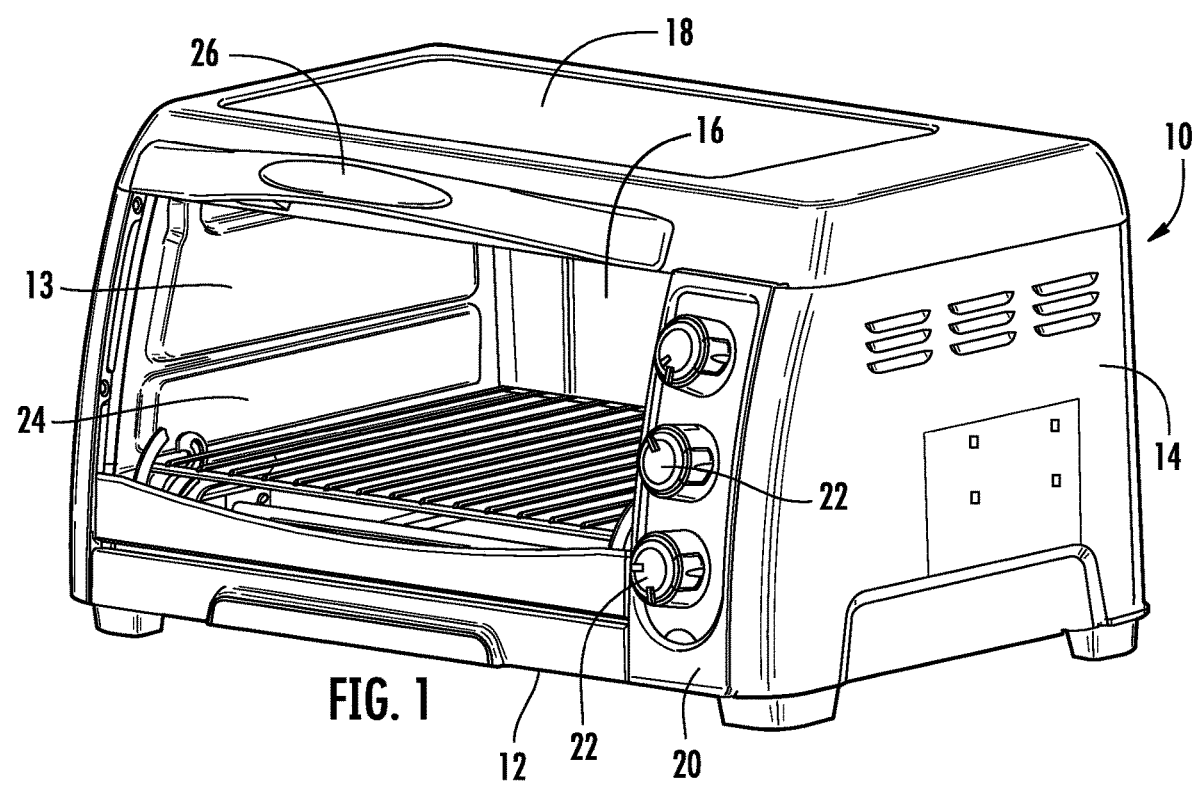
FIG. 1 is a front perspective view of a multi-functional toaster-oven with air frying capability according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the drawings, a multi-functional toaster-oven, designated broadly at 10, is shown in FIG. 1. The toaster-oven 10 is generally box-shaped and includes a floor 12, side walls 13, 14, a rear wall 16, and a ceiling 18. The front of the toaster-oven 10 includes a panel 20 that covers a portion of the front of the device, and which has control dials 22 mounted thereon that are connected with a controller 200 (depicted in FIG. 7). The remainder of the front of the toaster-oven 10 is covered with a door 24 (shown as transparent in FIG. 1) that is pivotally attached to the floor 12. A handle 26 is mounted to the upper portion of the door 24 to facilitate opening and closing of the door 24.

As can be seen in FIGS. 2-5, an internal side wall 28 is present inboard of the side wall 14 and extends from the inboard edge of the panel 20 to the rear wall 16. The floor 12, the side wall 13, the rear wall 16, the ceiling 18, the door 24 and the internal side wall 28 define a cooking cavity 30. The internal wall 28, the floor 12, the side wall 14, the rear wall 16, the ceiling 18 and the panel 20 define a control cavity 32. Typically, the cooking cavity 30 has a width dimension (between the side wall 13 and the internal wall 28) of about 10 to 14 inches, a depth dimension (from the door 20 to the rear wall 16) of about 10 to 14 inches, and a height (from the floor 12 to the ceiling 18 of about 6 to 9 inches. As is conventional in toaster-ovens, the width and/or depth of the cooking cavity 30 are greater than the height.

Within the cooking cavity 30, the toaster-oven 10 may have one or more cooking racks. More specifically, a grill-style lower rack 34 extends between the side wall 13 and the internal side wall 28. The lower rack 34 is supported within a slot 36 in the side wall 13 and a set of three discontinuous slots 38 in the internal side wall 28 (see FIG. 6). The front member of the rack 34 is captured by two hooks 40 that are also attached to the door 24, such that opening of the door 24 draws the lower rack 34 forwardly as it slides within the slots 36, 38. The hooks 40 also enable the lower rack 34 to be removed entirely.

Figure 6:
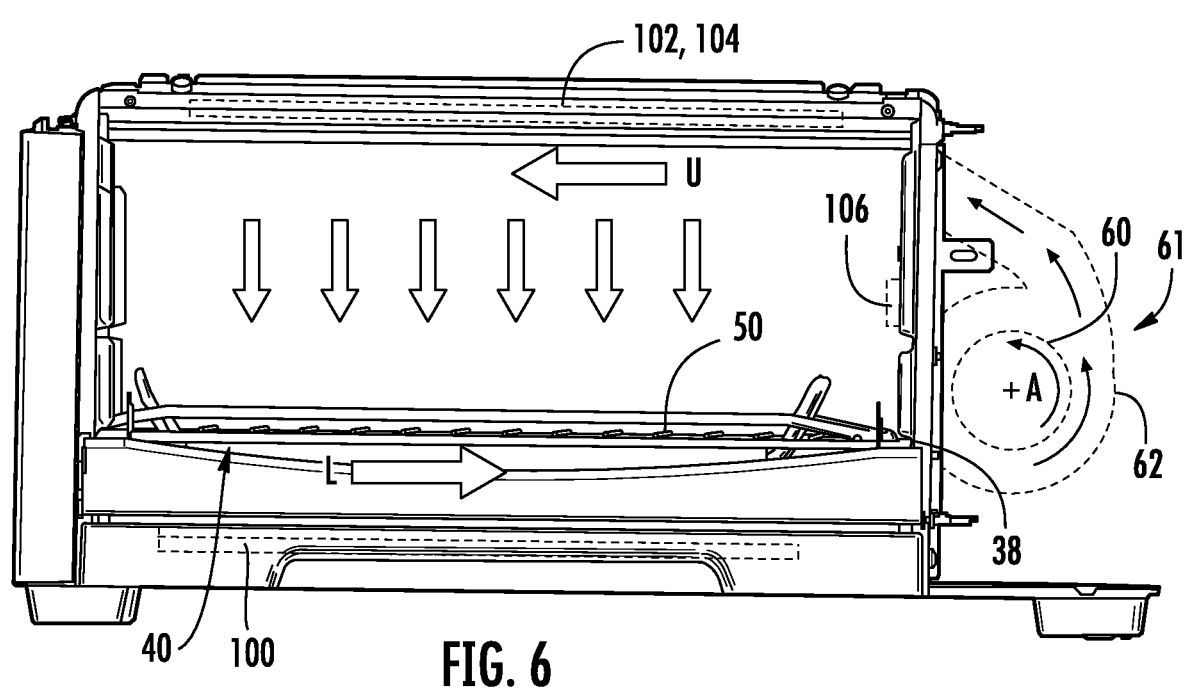
FIG. 6 is a front view of the toaster-oven of FIG. 1 with the door removed and the fan and shroud shown in phantom line to illustrate air flow in the cooking and operations cavities.
Figure 8:
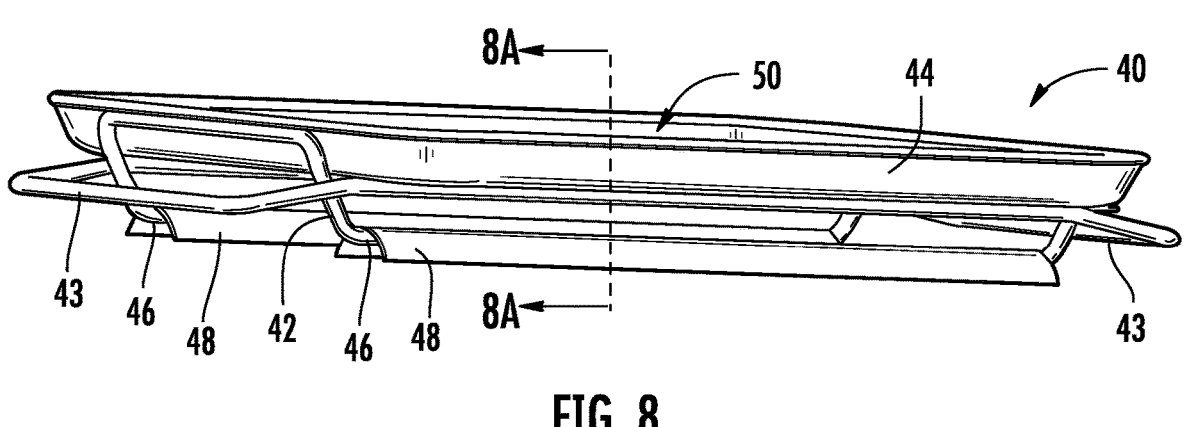
FIG. 8 is a front perspective view of the frying rack of the toaster-oven of FIG. 1.
Figure 8A:
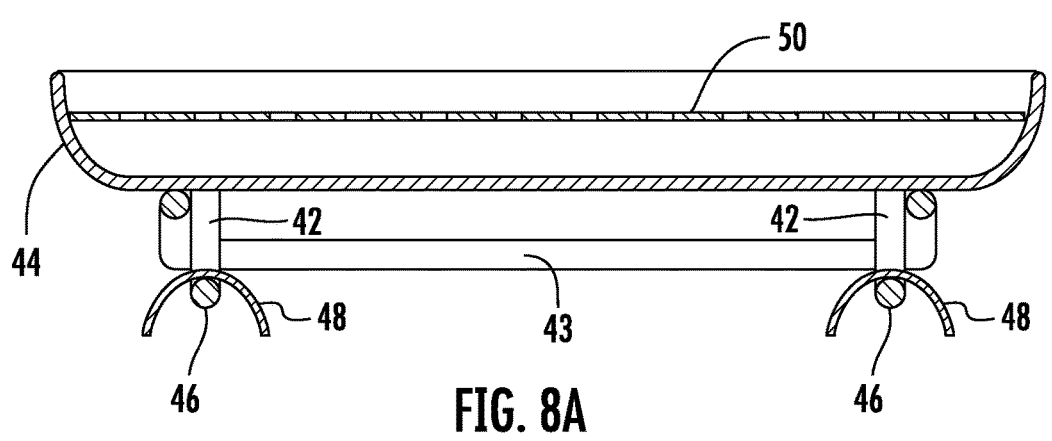
FIG. 8A is a section view of the frying rack taken along lines 8A-8A of FIG. 8.

As seen in FIGS. 6, 8 and 8A, a frying rack 40 is illustrated therein. The frying rack 40 may be employed in place of the lower rack 34 described above. The frying rack 40 includes a wire frame 42 that has lowered ends 43 that are configured to fit within the slots 36, 38 described above. A generally rectangular pan 44 is mounted to the upper surface of the wire frame 42. Two runners 46 are mounted to the lower surface of the pan 44 and extend lengthwise beneath it. An arcuate heat shield 48 (typically formed of painted or plated steel) is mounted to each of the runners 46. A grill 50 (see FIG. 8A) is positioned within the pan 44 and above the bottom surface of the pan 44 to create a gap 52.

In some embodiments, the frying rack 40 may include notches, recesses, protrusions, projections, latches or other features (see, e.g., FIGS. 14, 15, 15A and 15B) that mate with complementary features in the wall(s) 13, 14 to ensure that the frying rack 40 is positioned within the cooking cavity 30 at the proper height and location. Proper location of the frying rack 40 (and, in turn, food resting thereon) can provide more consistent cooking results and prevent food from falling or dripping from the rack 40 onto the underlying heating elements 100 (discussed below).

Figure 7:
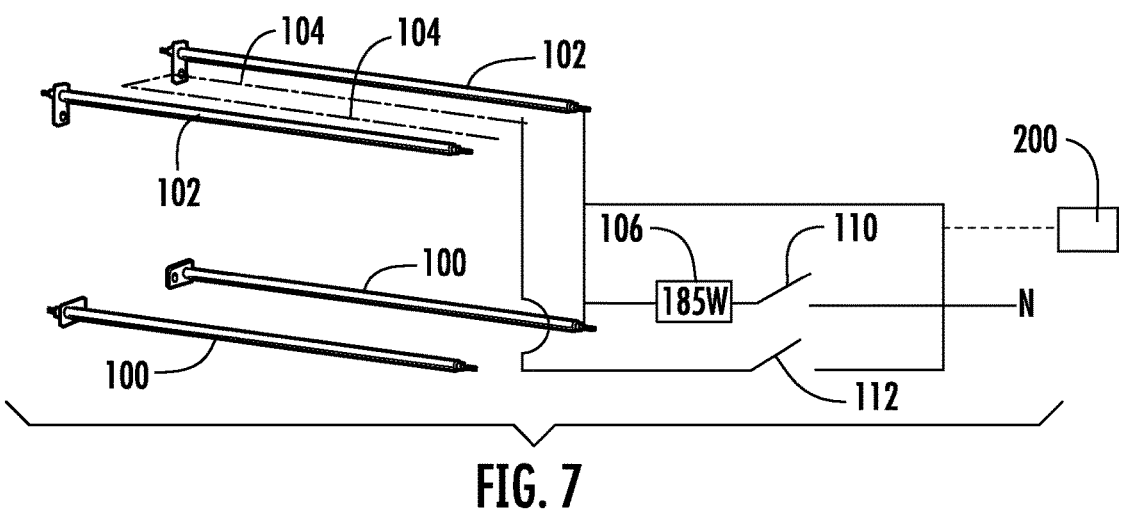
FIG. 7 is a schematic diagram of the heating system of the toaster-oven of FIG. 1.

Referring now to FIGS. 6 and 7, the heating elements of the toaster-oven 10 are shown therein. More specifically, two elongate heating elements 100 are located in the lower region of the cooking cavity 30 below the rack 40. Two elongate heating elements 102 are located in the upper region of the cooking cavity 30. These heating elements 100, 102 are electrically connected so that they are all activated when the toaster-oven is used for toasting or heating. In addition, two elongate supplementary heating elements 104 are also positioned in the upper region of the cooking cavity 30 (e.g., between the heating elements 102), and another supplementary heating element 106 is positioned elsewhere in the cooking cavity 30 (for example, mounted to the internal side wall 28) or in the control cavity 32 as discussed below. The supplementary heating elements 104, 106 are electrically connected to the heating elements 100, 102 (e.g., via switches 110, 112 shown schematically in FIG. 7) so that they are activated when the toaster-oven 10 is used in an air frying mode (e.g., both switches 110, 112 are closed), but are not activated when the toaster-oven 10 is used in a toasting or heating mode (the different modes of cooking are discussed below).

Figure 2:
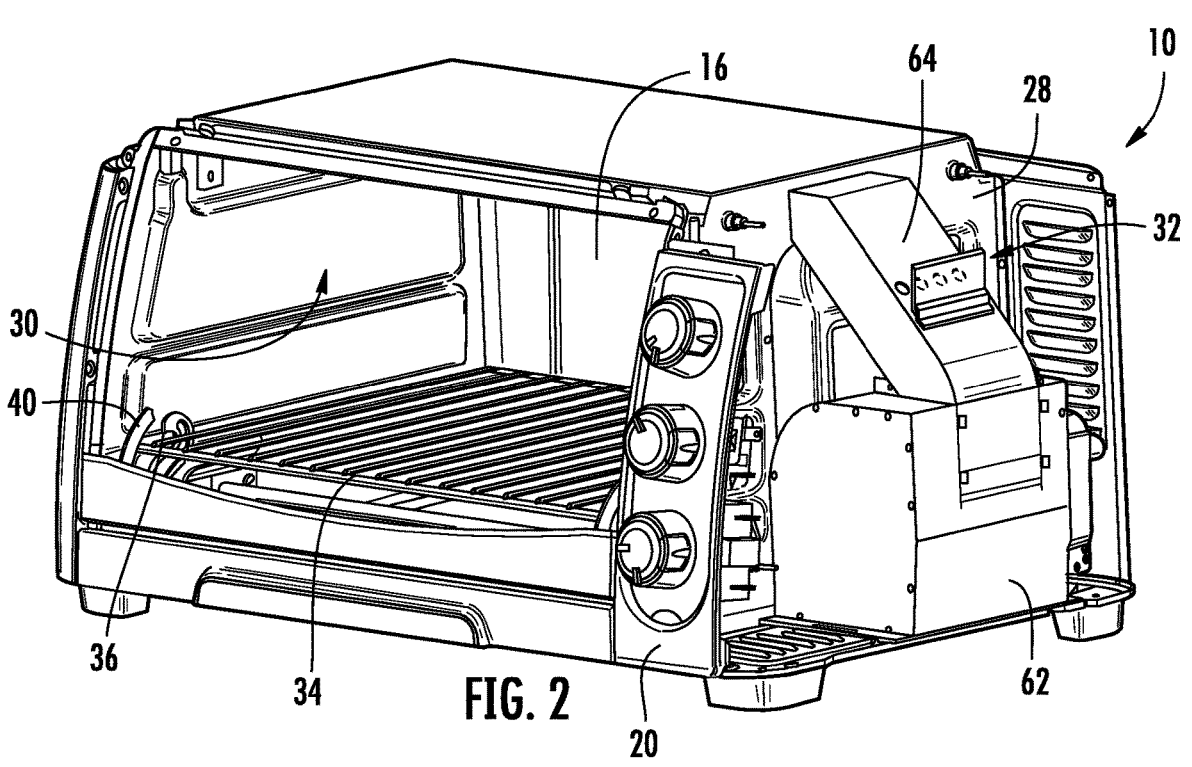
FIG. 2 is a front perspective view of the toaster-oven of FIG. 1 with a side wall removed.
Figure 3:
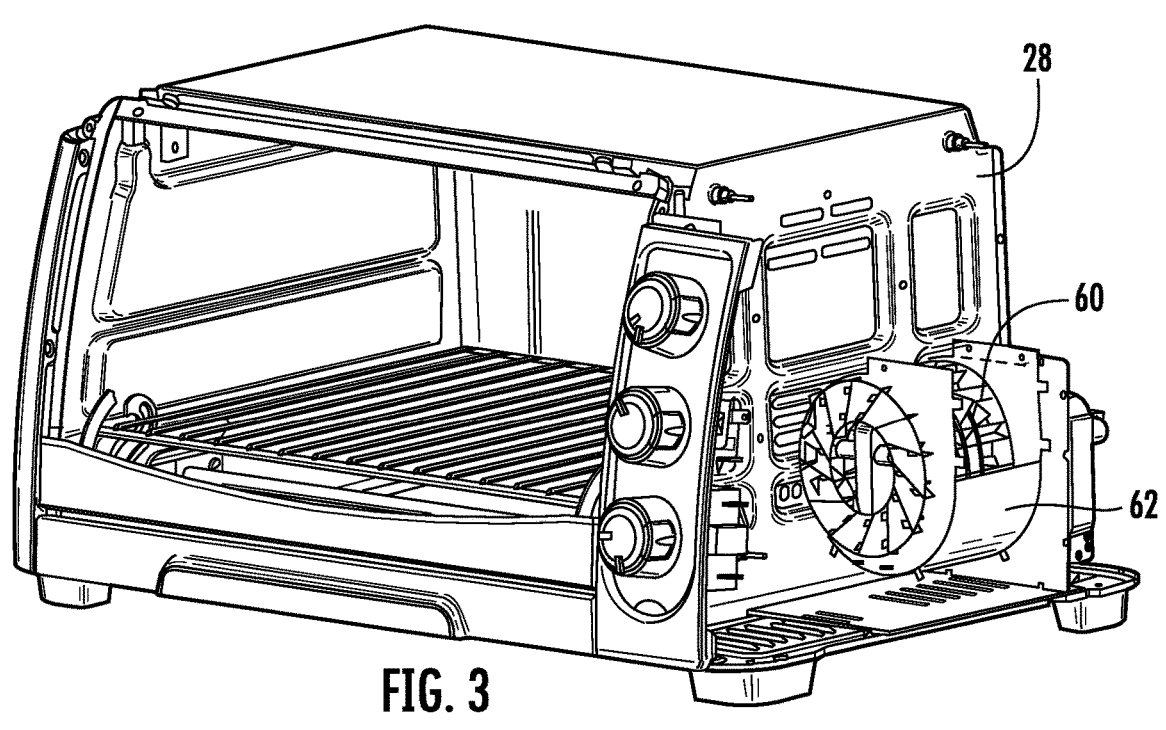
FIG. 3 is a front perspective view of the toaster-oven as in FIG. 2 with a portion of the fan shroud removed.
Figure 4:
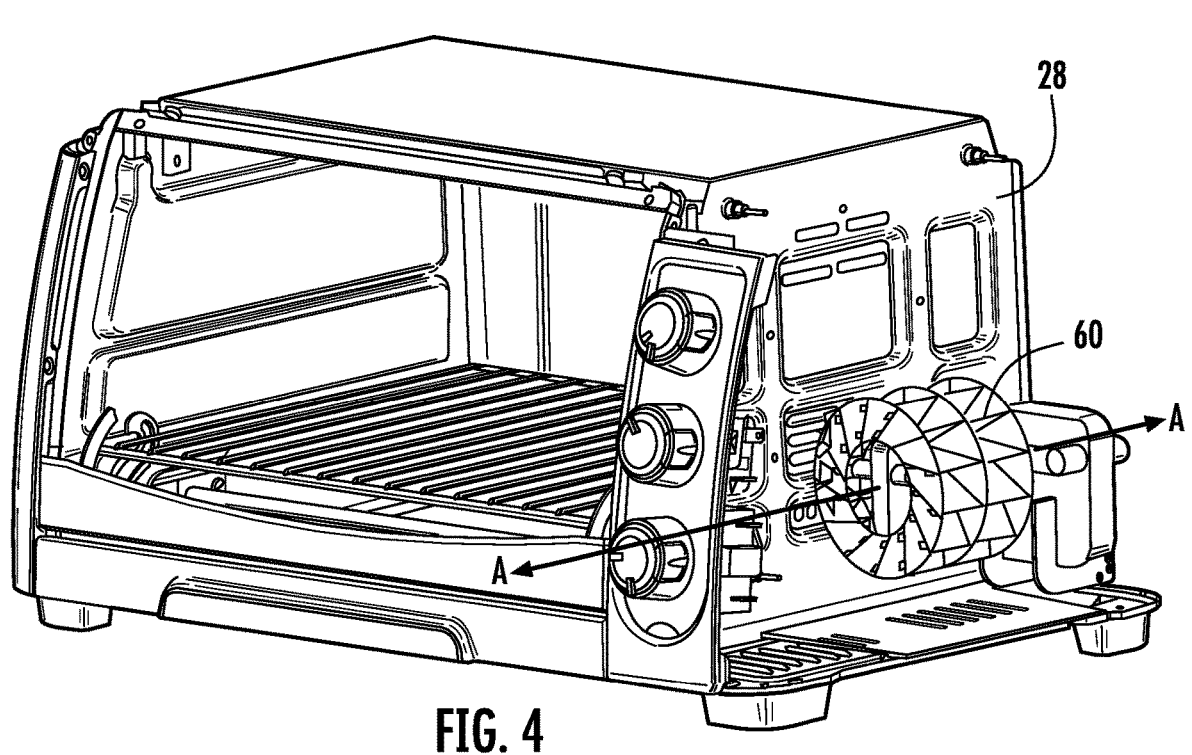
FIG. 4 is a front perspective view of the toaster-oven as in FIG. 3 with the entire fan shroud removed.
Figure 5:
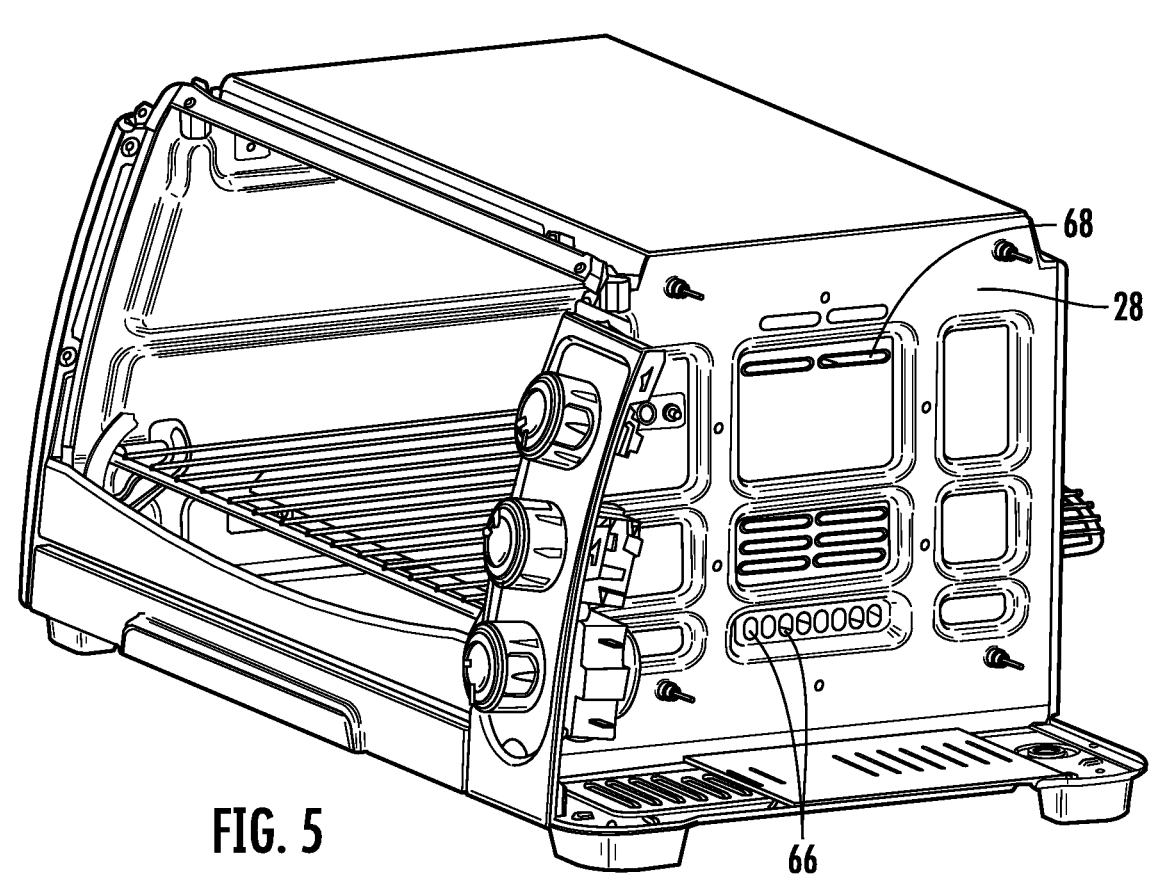
FIG. 5 is a front perspective view of the toaster-oven as in FIG. 4 with the fan shroud and fan removed.

Referring now to FIGS. 2-4, within the control cavity 32, the toaster-oven 10 includes a recirculation duct 61 within which is mounted a fan 60. The fan 60 is illustrated herein as a centrifugal impeller fan which is oriented such that it rotates about an axis A that is generally parallel with the internal side wall 28 (i.e., the axis A extends through the hub of the impeller from the front of the toaster-oven 10 to the rear). The recirculation duct 61 also includes a shroud 62 that covers the fan 60. The fan 60 and shroud 62 are configured such that impellers or other air-directing members of the fan 60 draw air from the cooking cavity 30 through one or more relatively large inlet vents 66 positioned in a lower area of the internal wall 28 into the shroud 60 (see FIG. 5). In some embodiments, the lower inlet vents 66 are positioned below the elevation of the cooking surface of the grill 50 of the frying rack 40, which can encourage a desirable air flow pattern as described herein. The shroud 62 leads to an outlet 64 that delivers air back into the cooking cavity 30 through upper outlet vents 68 that are positioned in an upper area of the internal wall 28. Any or all of the vents 66, 68 may be covered by screens or filters to prevent food crumbs or particles from reaching the fan 60 or shroud 62.

Figure 6A:
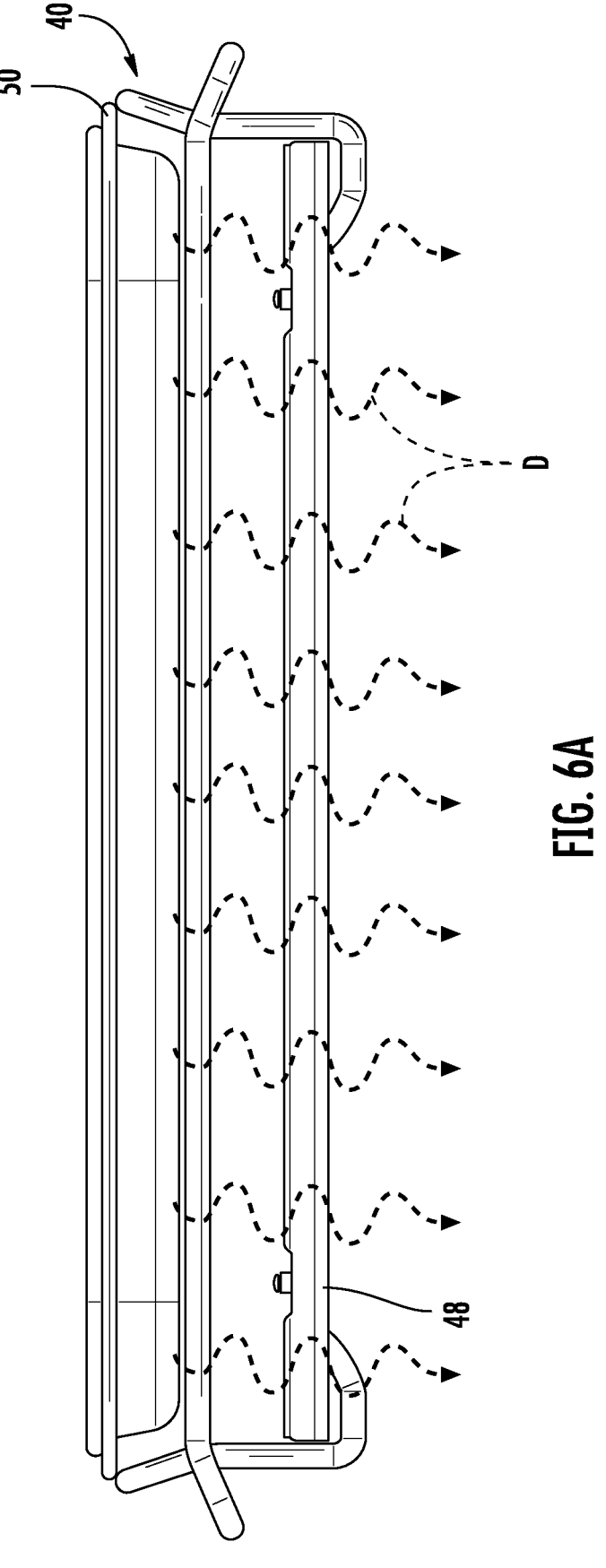
FIG. 6A is a front view of the frying rack of the toaster-oven of FIG. 1 illustrating a "downdraft" effect induced by frozen or cool food resting on the grill of the frying rack.
Figure 10:
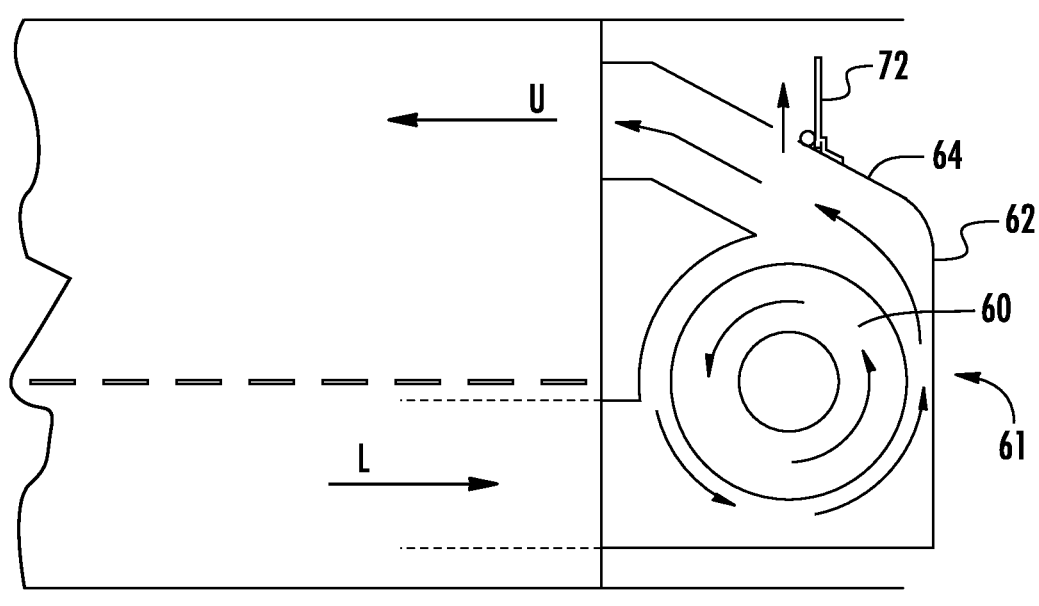
FIG. 10 is a schematic front view of the fan and shroud of the toaster-oven of FIG. 1 illustrating the rotation of the fan and the resultant air flow in the shroud.

The positioning and orientation of recirculation duct 61, and in particular the fan 60 and the vents 66, 68, results in a general air flow pattern illustrated in FIGS. 6, 6A and 10. More specifically, operation of the fan 60 causes the impeller to rotate in a counterclockwise direction from the vantage point of FIGS. 6 and 10. Such rotation draws air into the shroud 62 through the lower vents 66 and forces air out through the upper vents 68. This flow pattern has the overall general effect of air being drawn into the lower vents 66 from a lower region of the cooking cavity 30 beneath the grill 50 of the frying rack 40 (shown by the right-pointing arrows L in FIGS. 6 and 10), around the fan 60 and upwardly through the shroud 62 (see FIG. 10), and forced out of the upper vents 68, across the upper region of the cooking cavity 30 (shown by the left-pointing arrows U in FIGS. 6 and 10), and downward within the cooking cavity 30. In some instances, there may also be a beneficial "downdraft" effect that occurs within the cooking cavity 30. Referring to FIG. 6A, food resting on the grill 50 of the frying rack 40 is typically cooler than the ambient air surrounding it. This is particularly true for frozen foods, such as frozen French fries. The cooler temperature of the food can create a natural downdraft of air (shown by the arrows D in FIG. 6A), which can enhance the tendency of the air to follow the flow path described, and in doing so pass evenly over food on the cooking surface. (It should be understood that additional, centrally-located vents, which also serve as outlets for the shroud 62 into the cooking cavity 30, may be desirable for larger toaster-ovens, as their larger cooking cavities are capable of cooking a wider array of food sizes and varieties.)

Generally speaking, conventional toaster-ovens occupy a relatively large footprint, and have a relatively short (in height) cooking cavity. In contrast, air fryers tend to have taller cooking cavities with smaller footprints. Air fryers are also typically designed to provide an air flow that is sufficient in temperature, humidity, volume and velocity to absorb and expel moisture from the food surfaces. Such air flow, when created with the correct balance of dehydration and heat, can produce food with a desirable crisp finish/texture. The air flow pattern described above, driven by the fan 60 and directed by the shroud 62, can create an environment in which the airflow (which may be 15-25 cfm, in some cases about 20 cfm) produces cooking conditions that enable satisfactory frying. The orientation of the fan 60, with its axis of rotation A being generally parallel with the internal wall 28 (i.e., with the front-to-back direction of the toaster-oven 10) can facilitate the creation of a relatively large, relatively low velocity airstream into and through the food on the cooking surface.

One characteristic that can improve air flow, and in turn frying quality, is to position the food low in the cooking cavity 30. Such positioning can tend to even air flow across the food and/or to create a low velocity airstream around the food, while positioning the food far from the higher velocity airstream exiting the vents 68. The suction zone of the fan 60 is non-jetted, and therefore forms a large, evenly-dispersed, low pressure flow field. As the distance from the food to the jetted outlet increases, the more likely the air is to evenly disperse across the food for even heating. As such, the food heats and releases moisture relatively evenly on all surfaces. Moreover, because the lower vents 66 are relatively large, and the intake duct of the shroud 62 is similarly large, the velocity of the airstream L is relatively low (particularly compared to the upper vents 68, which typically have a lower total open area than the lower vents 66), which can provide desirable cooking (i.e., air-frying) conditions.

In addition, the motor coil (not specifically shown) of the fan 60 be mounted relatively low in the control cavity 32, which can provide cooling advantages.

Figure 9:
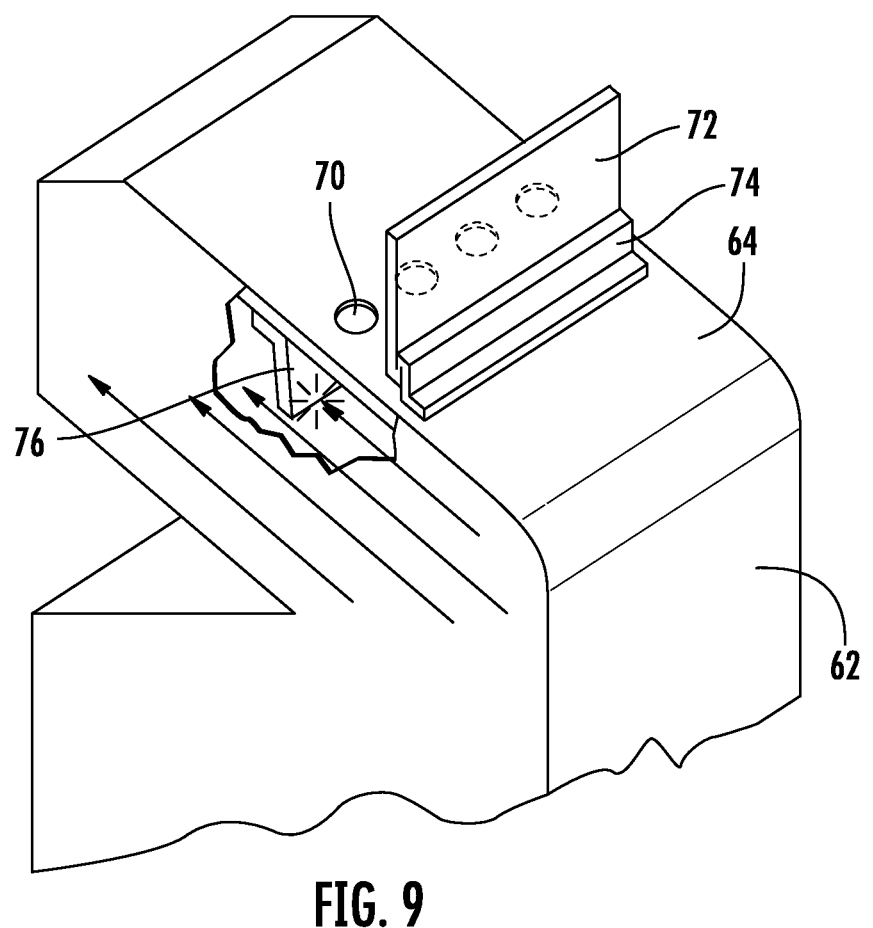
FIG. 9 is a partial top perspective view of the fan shroud of the toaster-oven of FIG. 1.

Referring now to FIGS. 9 and 10, vents 70 are present in the upper surface of the outlet 64 of the shroud 62. The vents 70 are covered with a flapper plate 72 that is mounted to the outlet 64 via a hinge 74. In some embodiments, a baffle 76 is located within the outlet 64 just downstream from the vents 70 and is configured to redirect some of the air traveling in the outlet 64 through the vents 70. The flapper plate 72 and hinge 74 may be configured so that the flapper plate 72 is biased toward the closed position (i.e., covering the vents 70), with movement to the open position requiring a predetermined magnitude of positive pressure through the vents 70 (e.g., 5 psi). Such biasing may be achieved via the weight of the flapper plate 72 itself, a spring-loaded hinge, or another mechanism.

Figure 11:
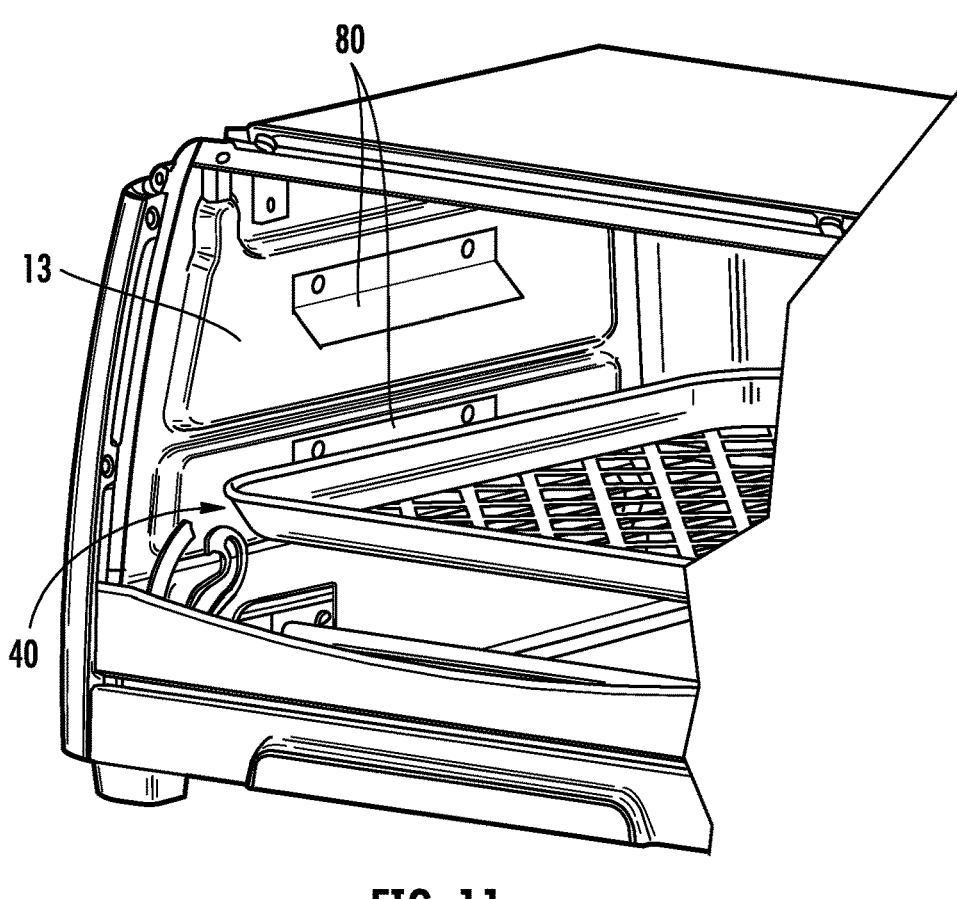
FIG. 11 is a partial front perspective view of baffles mounted on a side wall within the cooking cavity of the toaster-oven of FIG. 1.

Referring now to FIG. 11, the inner surface of the side wall 13 may have mounted on it one or more baffles 80. These baffles 80 are positioned so that air traveling down the inner surface of the side wall 13 may be slowed and redirected somewhat. The baffles 80 may be employed to assist with the creation of the air flow pattern described above. In addition, the lower of the baffles 80 may be positioned so that some of the air flowing down the side wall 13 may be deflected into the gap 52 between the pan 44 and the grill 50 (see FIG. 8A).

To operate the toaster-oven 10 in a conventional toasting or cooking mode, the user places food on the rack 34 and manipulates one or more of the dials 22 to the proper cooking/toasting setting. The dials 22 signal the controller 200 (which is typically located in the control cavity 32) to activate the heating elements 100, 102 to the desired time/temperature. In some embodiments, the heating elements 100, 102 may be 350 W heating elements, so that at full power the toaster-oven 10 produces 1,400 W of heat to toast or cook. Notably, at full power, the heating elements 100, 102 tend to "glow", which can enhance the crispness of a toasted surface of food. The toaster-oven 10 continues to toast/cook in conventional fashion until the food is done.

To operate the toaster-oven 10 in an air-frying mode, the user removes the rack 34, places the frying rack 40 within the cooking cavity 30, and places the food to be fried on the frying rack 40. The user then manipulates one or more of the dials 22 to the proper setting for air frying. The dials 22 signal the controller 200 to activate the heating elements 100, 102 as well as the supplementary heating elements 104, 106. However, in the illustrated embodiment, the heating elements 100, 102 are not fully activated; for example, if 350 W heating elements are used for the heating elements 100, 102, they may be activated only to 250 W, a level at which they do not "glow" as described above. The supplementary heating elements 104, 106 provide additional heat; for example, the supplementary heating elements 104 may be 250 W heating elements, and the supplementary heating element 108 may be a 185-200 W heating element. Thus, when the heating elements 100, 102 are partially activated to 250 W, and the supplementary heating elements 104, 106 are at full power, the total wattage of the toaster-oven is about 1700 W, which is a typical heat load for an air fryer. However, because none of the heating elements 100, 102, 104, 106 is sufficiently heated to reach a "glowing" state, they do not toast the food; instead, the food gradually and consistently loses moisture and heats up in the manner of traditional frying. Of course, in other embodiments the overall power level may vary (for example, the total wattage may be between 1,100 and 1,300 W).

Also notable is the presence of the heat shields 48 on the frying rack 40. When the frying rack 40 is in place, each of the heat shields 48 is positioned directly above a respective heating element 100, such that heat from the heating elements 100 is deflected from directly reaching the food. As a result, the portions of food nearest the heating elements 100 are not "cooked" directly by the heating elements 100, but instead the heat from the heating elements 100 flows into the airstream L.

Further, when the toaster-oven 10 operates in the air-frying mode, the controller 200 activates the fan 60, which creates the air flow pattern discussed above. In operation, the air stream generated by the fan 60 creates sufficient pressure that it causes the flapper plate 72 to pivot upwardly from the upper surface of the shroud 62, thereby opening the vents 70 and allowing a portion of the airstream to exit through the vents 70. In some embodiments, between about 15 and 30 percent of the overall airstream may escape through the vents 70 (as an example, if the airstream has a flow rate of 20 cfm, the portion that escapes through the vents 70 may be 3 to 6 cfm). As the vented portion of the airstream escapes the vents 70, it carries with it moisture that has been drawn from the food as it cooks. Thus, the vents 70 serve to reduce the humidity in the cooking cavity 30. The reduction in humidity can help to produce a crisp finish/texture to the food. (This venting of a portion of the airstream can cause some loss of heat from the airstream. In some instances, it may be desirable to include additional thermal insulation in the walls of the toaster-oven and/or to employ materials, such as potassium ion-coated LowE glass, in the door to reduce heat loss).

Figure 12:
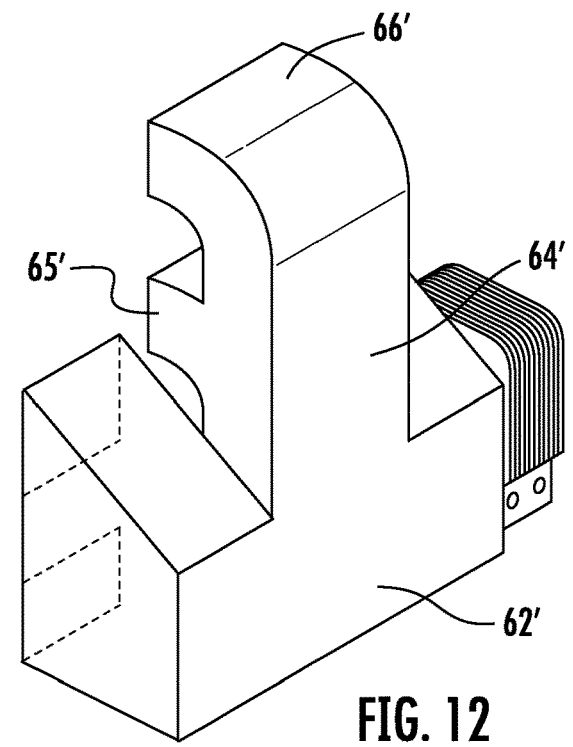
FIG. 12 is a fan shroud for a toaster-oven according to other embodiments of the invention.

Those of skill in this art will appreciate that the toaster-oven 10 may take other forms. For example, larger toaster-oven designs (e.g., those with cooking cavities of between about 1 and 1.4 cubic feet, such as 1.2 cubic feet), may include additional features. As one example, FIG. 12 illustrates an alternative fan shroud 62' as part of the recirculation duct 61 The shroud 62' includes an outlet duct 64' with two separate outlets: a lower outlet 65' and an upper outlet 66'. Each of the outlets 65', 66' leads to appropriately positioned vents (not shown herein) in the internal wall 28 that open into the cooking cavity 30. A shroud of this configuration may be well-suited for a larger toaster-oven that, for example, may receive a second frying rack.

Figure 13:
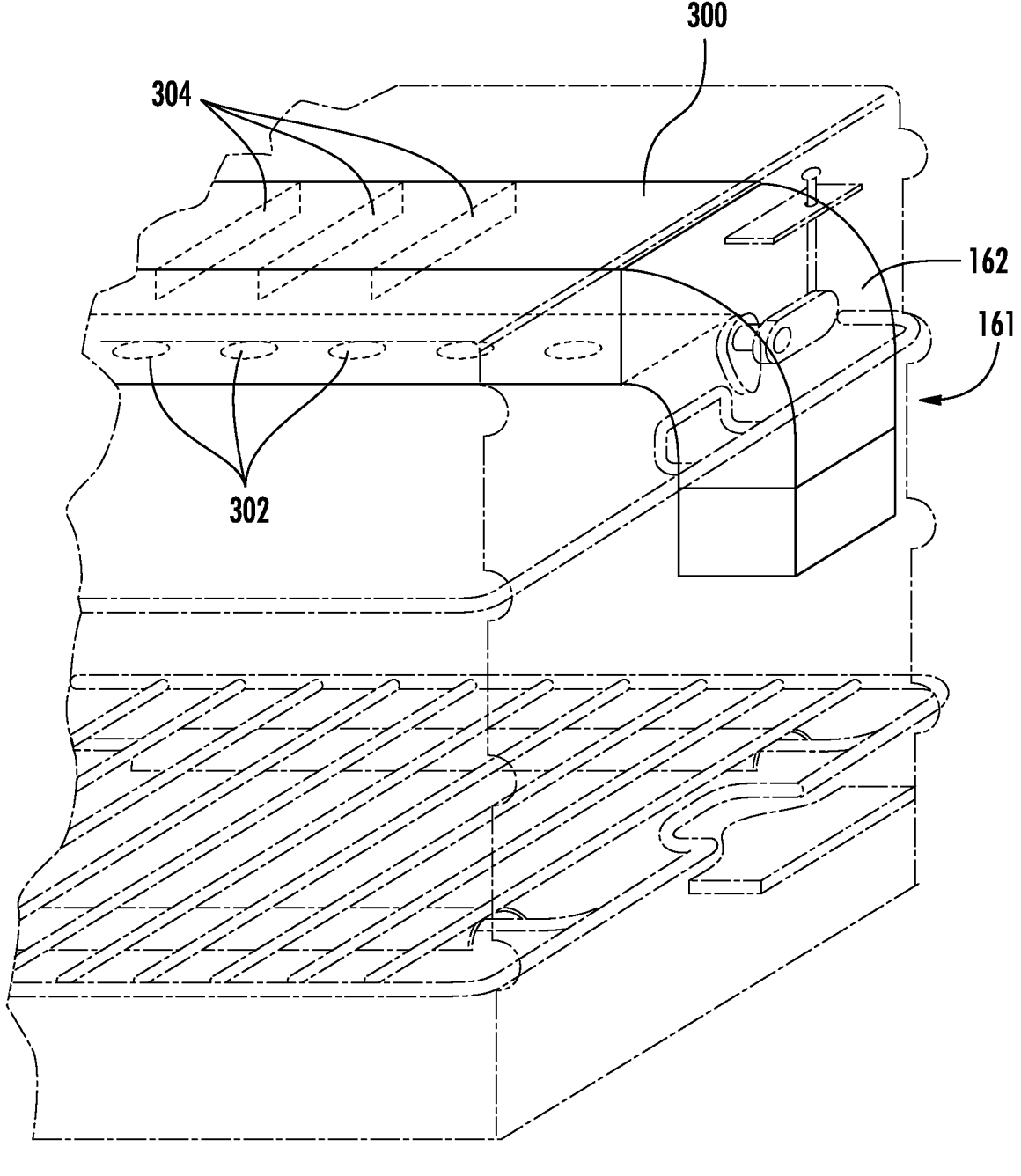
FIG. 13 is a schematic view of an upper duct system for a toaster-oven according to additional embodiments of the invention.

As another example of a variation in the toaster-oven 10, FIG. 13 illustrates a recirculation duct 161 in which a fan shroud 162 feeds directly into a duct 300 that extends above the cooking cavity (and in some embodiments across the entire cooking cavity) and discharges air downwardly into the cooking cavity. The duct 300 includes vent holes 302 in its lower surface that open into the cooking cavity 30. The duct 300 may also have louvres or baffles 304 within its interior to assist with the direction of air toward and through the vent holes 302.

Figure 14:
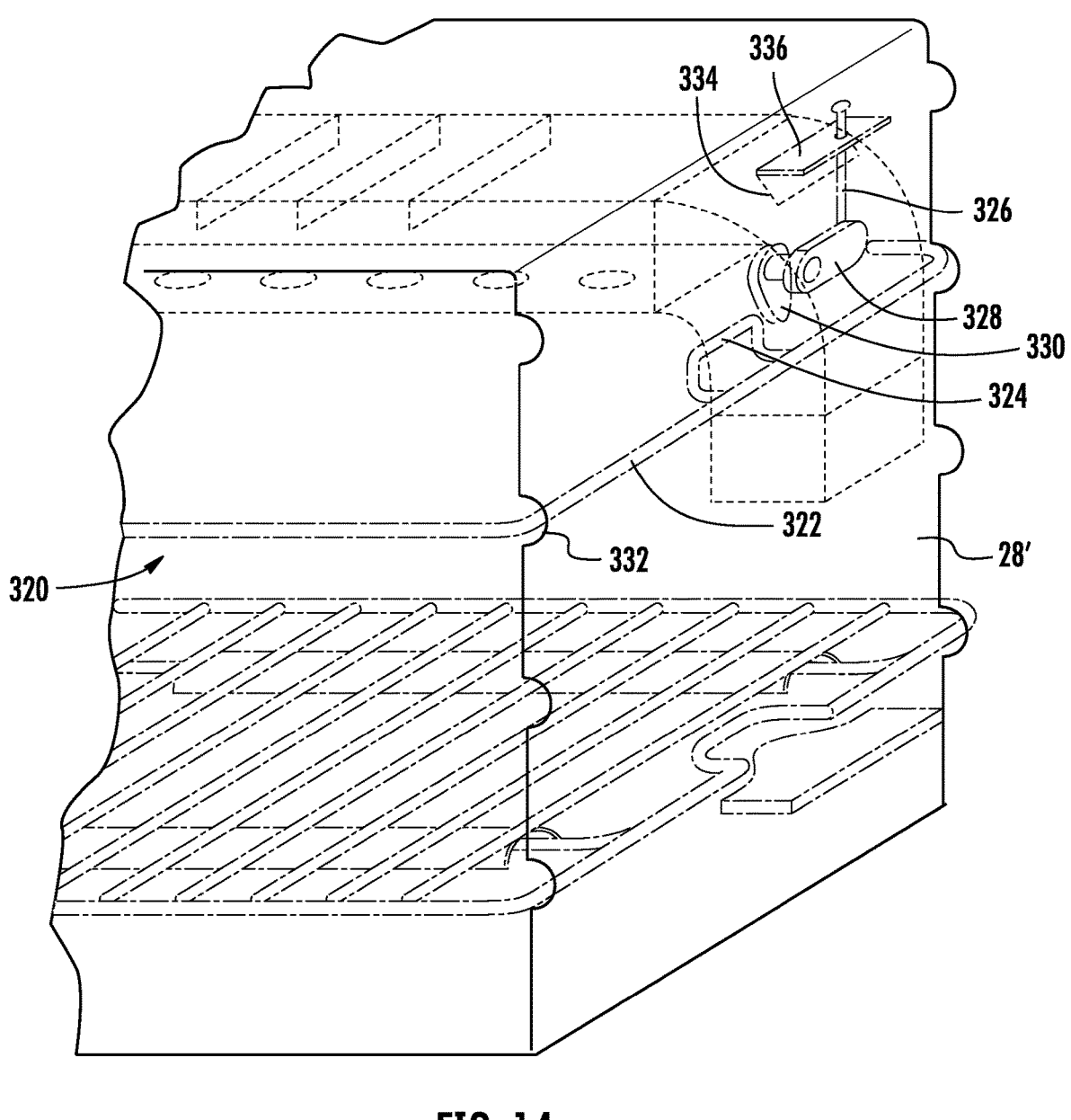
FIG. 14 is a schematic view of a cooking rack and a vent actuating system for a toaster-oven according to embodiments of the invention.

As a further example of a variation that may be suitable for a larger toaster-oven model, FIG. 14 illustrates part of the frame of a relatively deep fry basket 320. A wire tab 324 is present on an upper wire rim 322 on the basket 320. An actuator rod 326 is pivotally mounted to a pivoting crank 328. The crank 328 is fixed to a cam 330 that is pivotally mounted to the internal wall 28' of the toaster-oven 10'. When the fry basket 320 is slid into place within a slot 332 in the internal wall 28', the tab 324 engages the cam 330 and forces it to pivot. This action rotates the crank 328, which in turn extends the actuator rod 326 upwardly. The upward movement of the actuator rod 326 opens a pivoting flap valve 336 (shown in an open position in FIG. 14) that typically covers a humidity-reducing vent 334 in the duct 300. Opening of the flap valve 336 can enable additional humidity/moisture to be removed from the cooking cavity during cooking. In this manner, the vent 334 remains closed unless and until the fry basket 320 is inserted into the slot 332, ensuring both that the vent 334 remains closed when the fry basket 320 is note being used (presumably for toasting and conventional cooking) and that the vent 334 is open for air frying.

Figure 15:
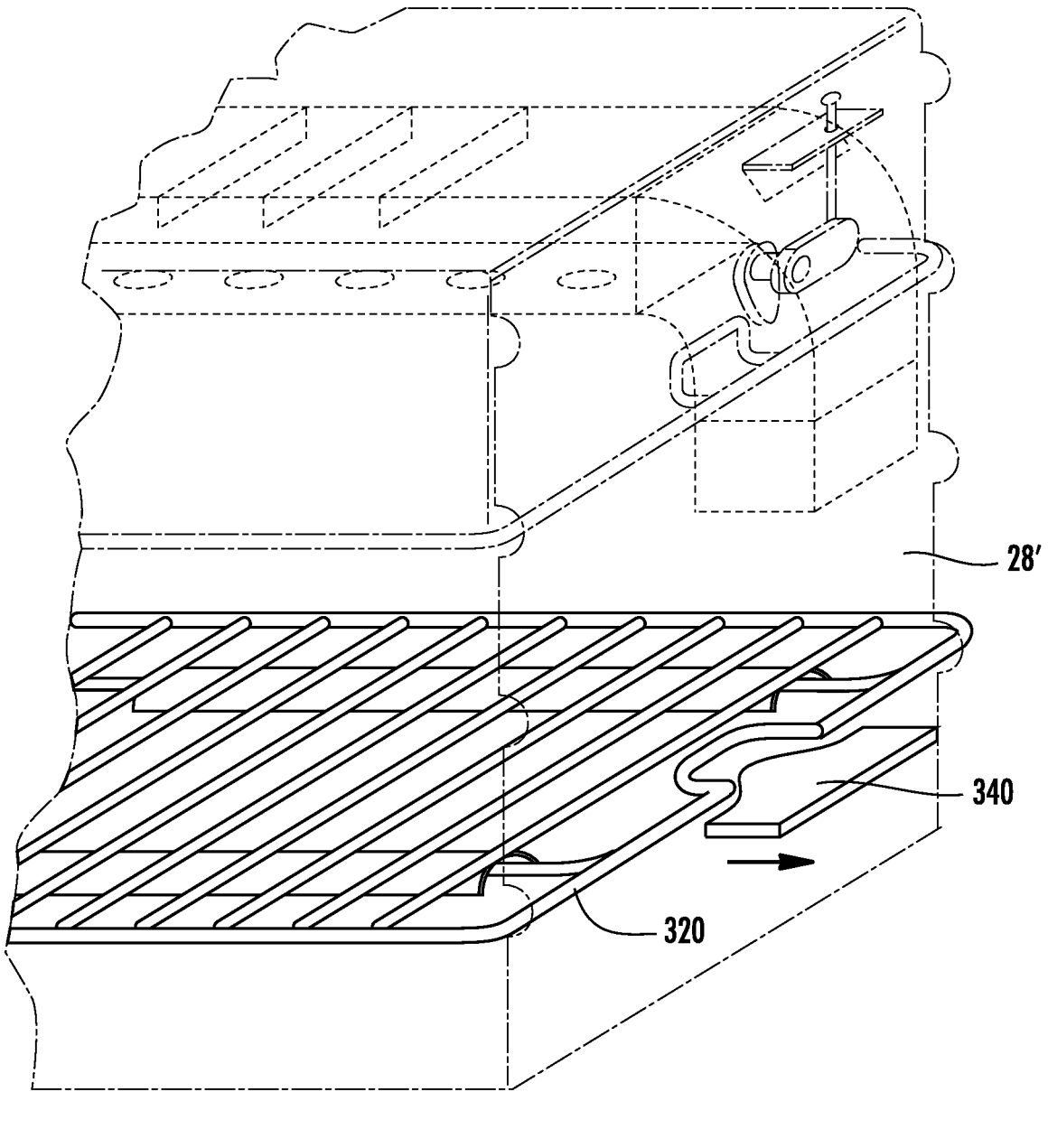
FIG. 15 is a schematic view of a cooking rack and a switch actuated by insertion of the cooking rack according to embodiments of the invention.
Figure 15A:
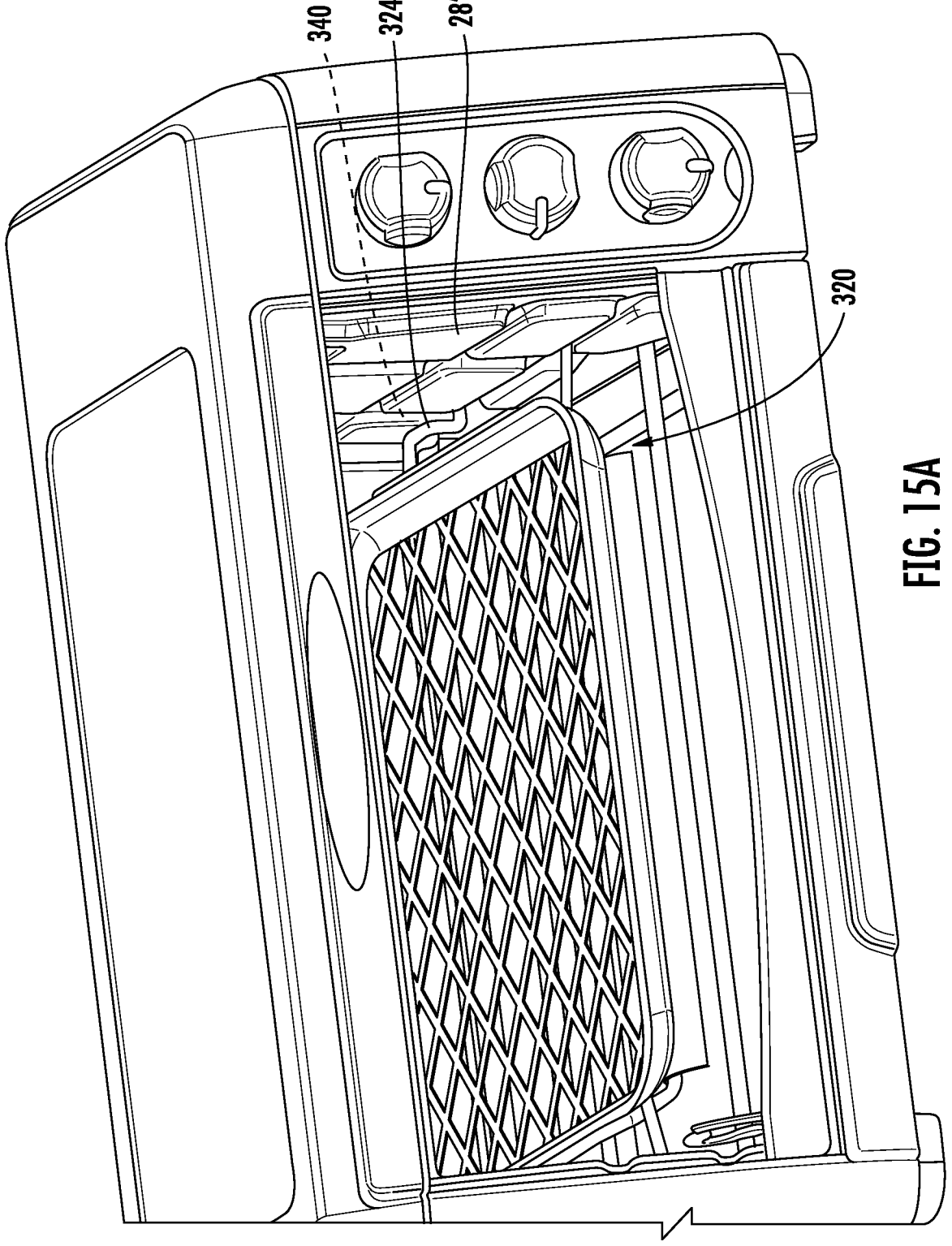
FIG. 15A is a front perspective view of a cooking rack with a projection that closes a switch according to additional embodiments of the invention.
Figure 15B:
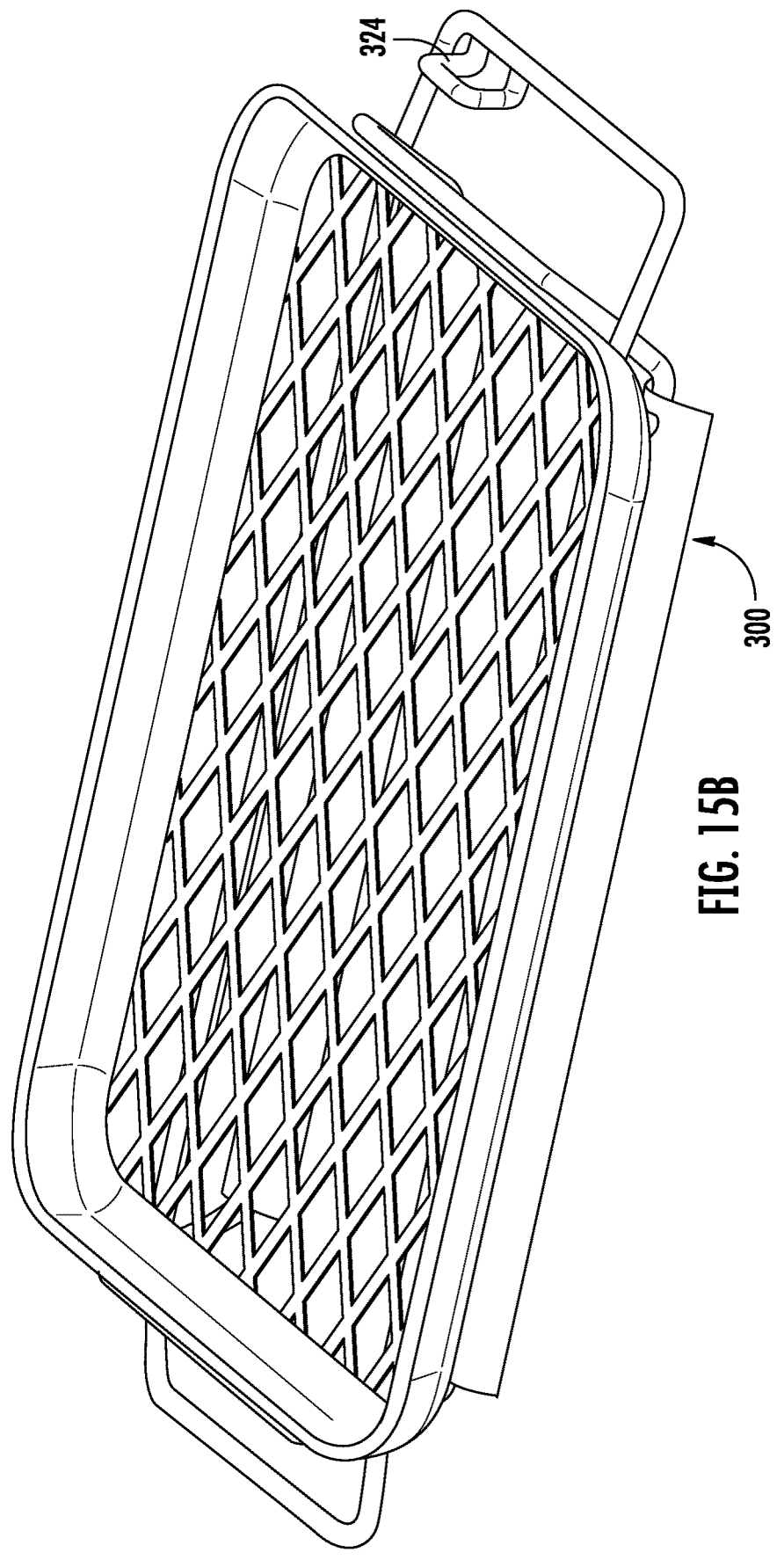
FIG. 15B is a top perspective view of the cooking rack of FIG. 15A.

Those skilled in this art will also appreciate that the wire tab 324 or a similar protrusion, projection, recess, notch, latch or the like may also serve other functions. For example, as illustrated in FIGS. 15, 15A and 15B, in some embodiments an electrical switch 340 may be present on the internal wall 28' of the toaster-oven 10, and positioned such that sliding the fry basket 320 into the proper slot activates the switch 340. Activation of the switch 340 (which is typically operatively connected with the controller 200) may enable the air-fry mode to operate (and, conversely, the air fry mode may not operate unless the switch 340 is activated). Thus, the combination of the tab 324 and the switch 340 may provide a mechanism that prevents the toaster-oven from operating in the air fry mode if the fry basket 320 is inserted into the wrong slot.

Figure 16:
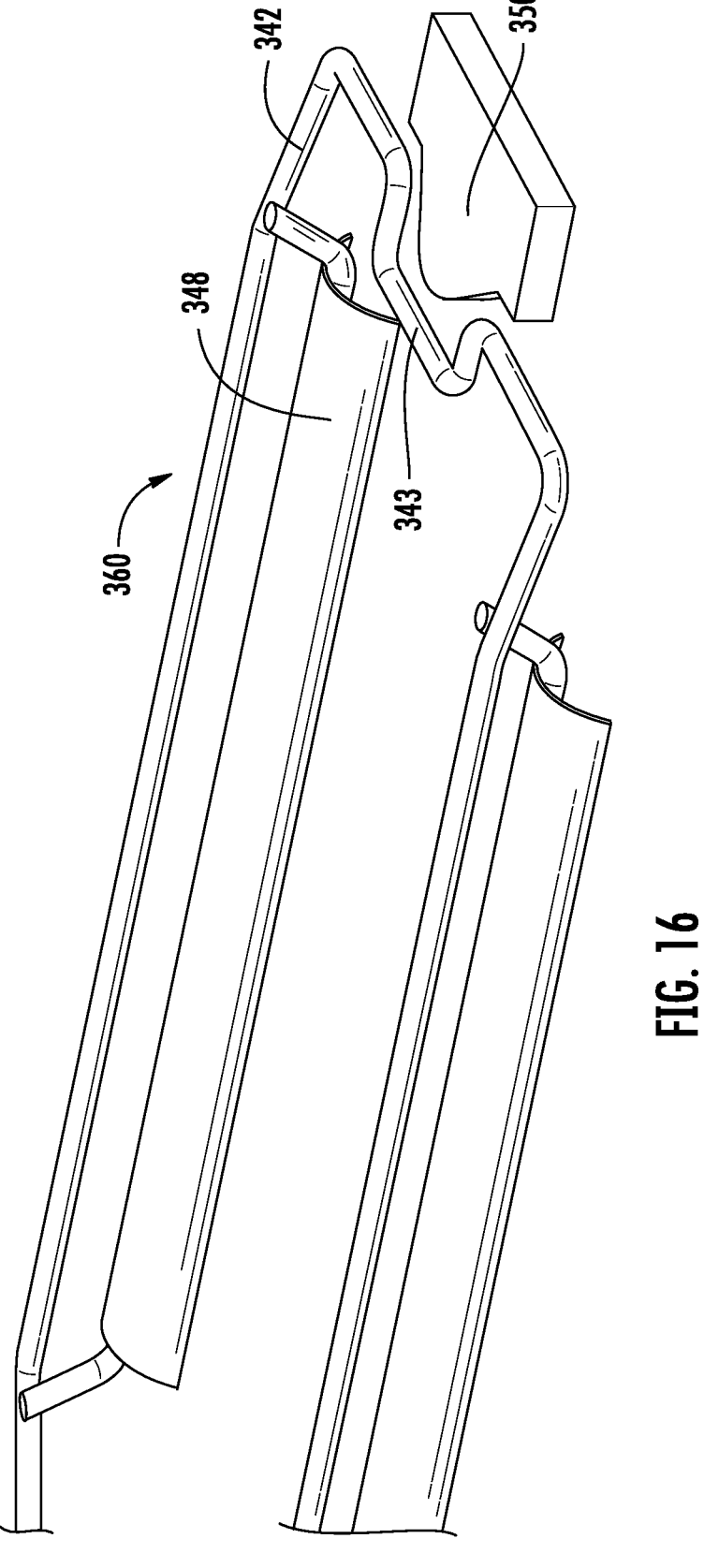
FIG. 16 is a front perspective view of a separate heat shield system with a feature for engaging a switch according to further embodiments of the invention.

Similarly, if a fry basket (e.g., 40 or 320) is formed as a separate component from the heat shields (such that the heat shields 348 are mounted as a unit 360 on their own separate frame 342—see FIG. 16), the heat shield frame 348 may have one or more protrusions that can interact with a switch 350 that in turn activates the air-fry mode. Such a mechanism may ensure that both (a) the heat shields 348 are in place for the air fry mode and (b) they are oriented correctly (i.e., they are not upside down). Those skilled in this art will appreciate that other, non-electrical protrusions and features may be present on the fry basket 320 and/or heat shield frame 348 to ensure proper orientation thereof when installed.

Figure 17:
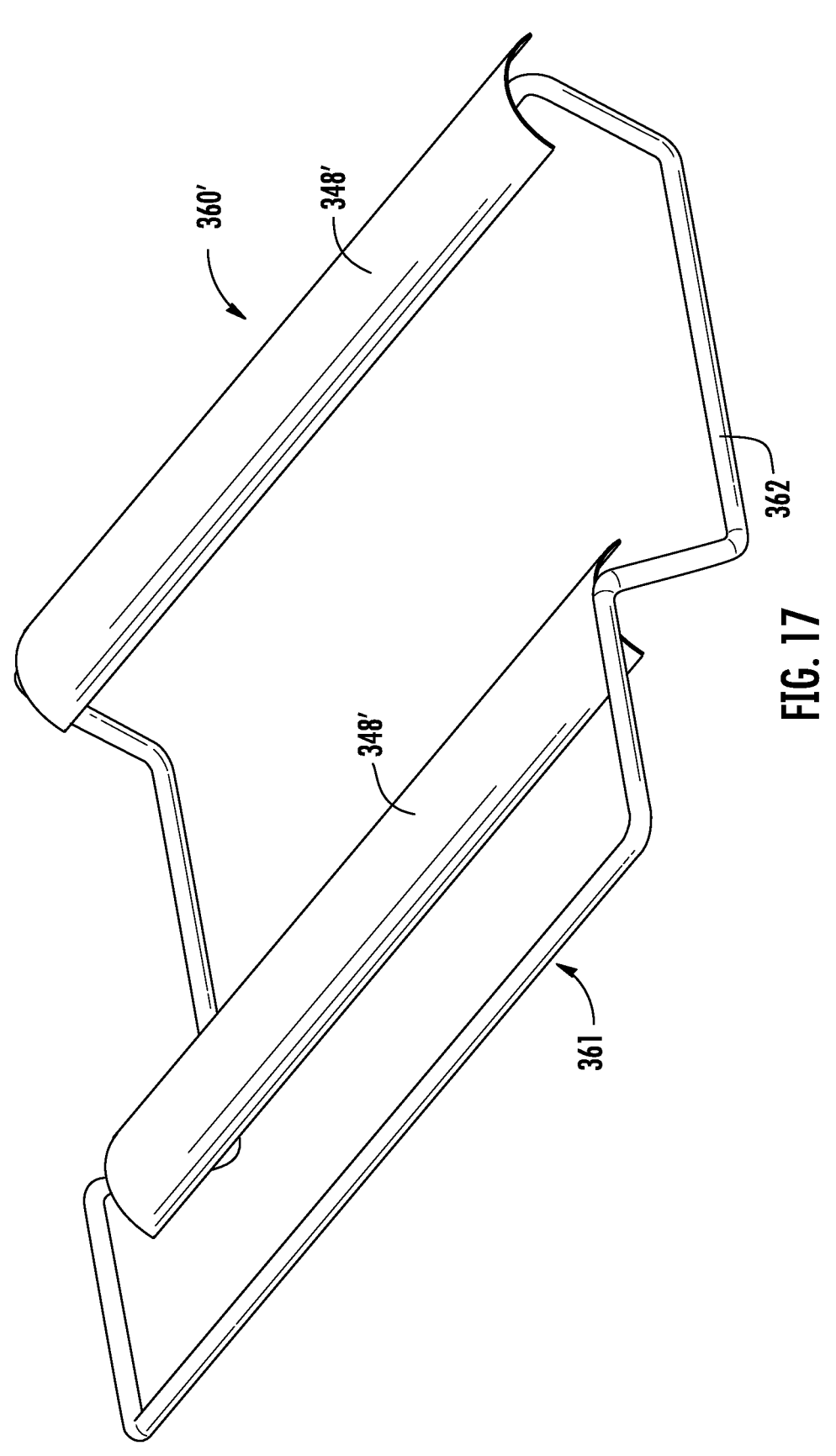
FIG. 17 is a front perspective view of a stand-alone heat shield system according to additional embodiments of the invention.
Figure 18:
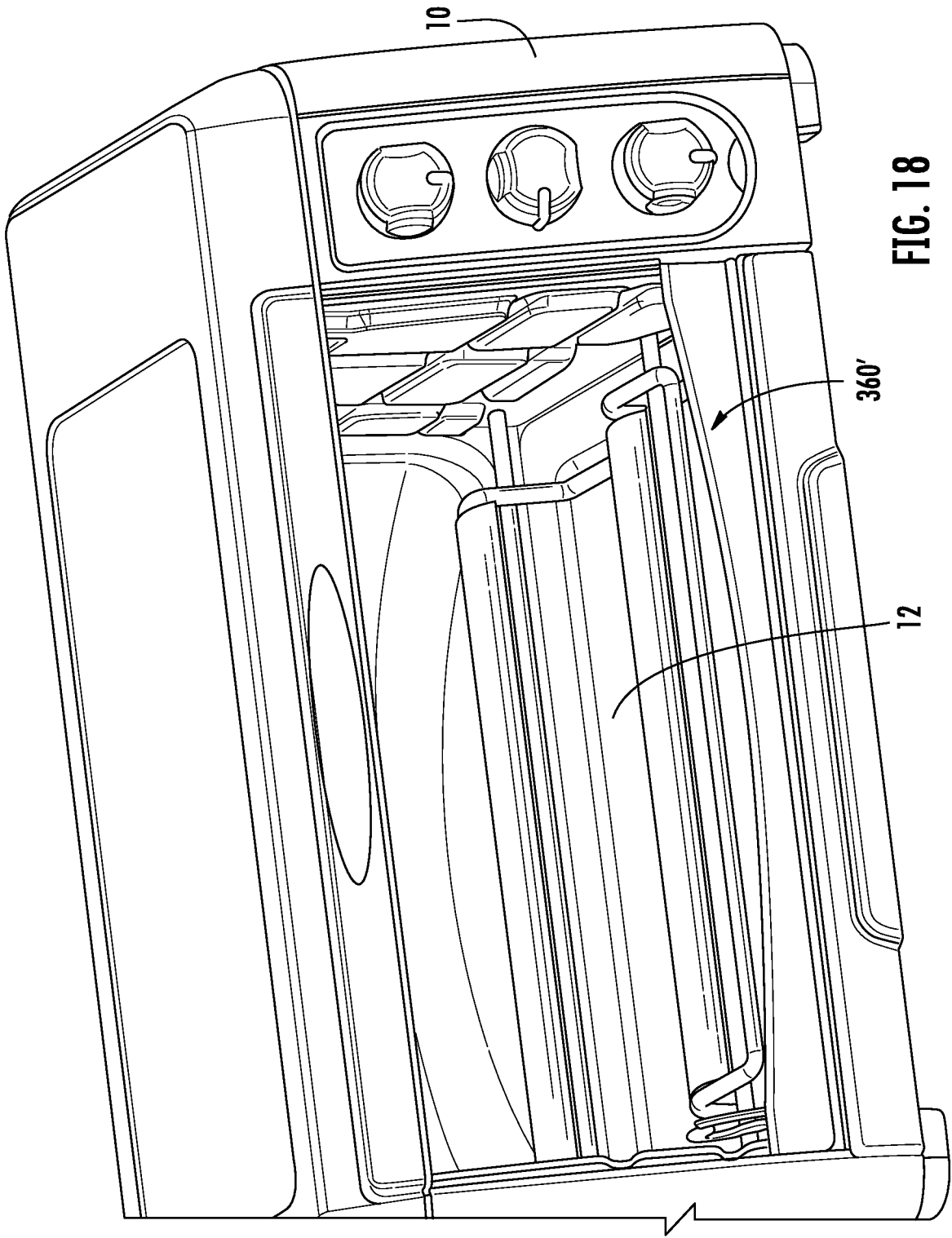
FIG. 18 is a front perspective view of the heat shield system of FIG. 17 installed on the floor of a toaster-oven.

Referring now to FIGS. 17 and 18, a separate heat shield assembly 360' may also be free-standing. The heat shield assembly 360' includes a wire frame 361 with two lower lateral runners 362 that are well below the elevation of the heat shields 348'. As can be seen in FIG. 18, the heat shield assembly 360' rests on the floor 12 of the toaster-oven 10 rather than being mounted in slots on the walls 13, 28.

Figure 19:
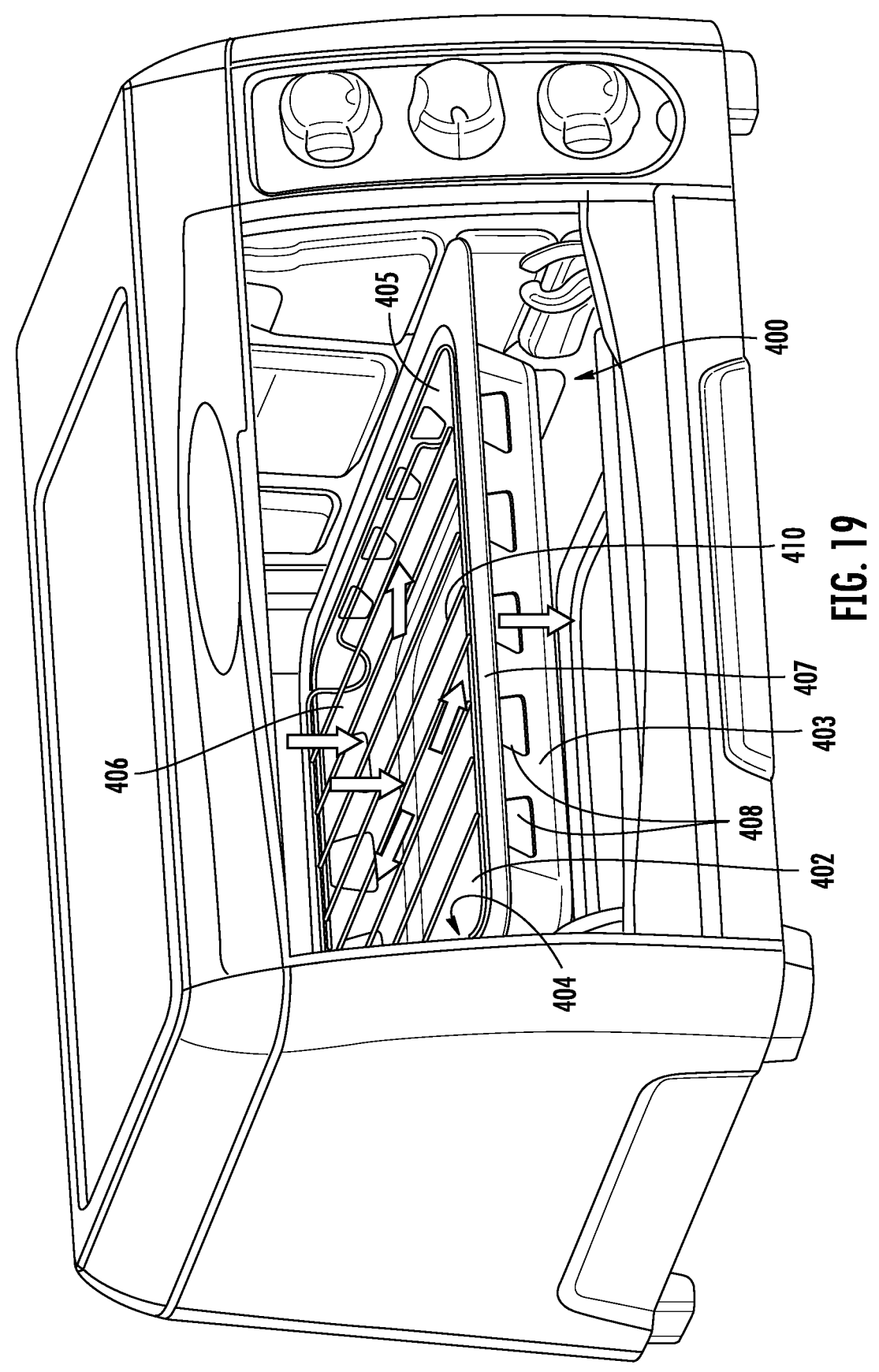
FIG. 19 is a front perspective view of a frying pan and rack for use in a toaster-oven according to further embodiments of the invention.

Referring now to FIG. 19, another embodiment of a pan, designated broadly at 400, is shown therein. The pan 400, which may be suitable for foods that are typically cooked in a solid pan like a skillet (e.g., steaks, burgers, chicken, etc.), is designed to have a somewhat modified air flow pattern. The pan 400 has a bottom surface 402, a front wall 403, side walls 404, 405 and a rear wall 406. A lip 407 extends outwardly from the upper edges of the walls 403-406. A grill 410 is positioned over and spaced from bottom surface 402. Each of the walls 403-406 includes a plurality of small windows 408 located below the elevation of the grill 410. The vents 408 provide exits for air that is directed downwardly from the ceiling of the toaster-oven onto food residing on the grill 410; the air descends from the ceiling, flows over and around the food, exits the vents 408, continues toward the floor of the toaster-oven, and is drawn therefrom into the vents in the internal wall 28 of the toaster-oven into the fan for recirculation. Thus, this arrangement further encourages the "downdraft" caused by colder food discussed above.

Figure 20:
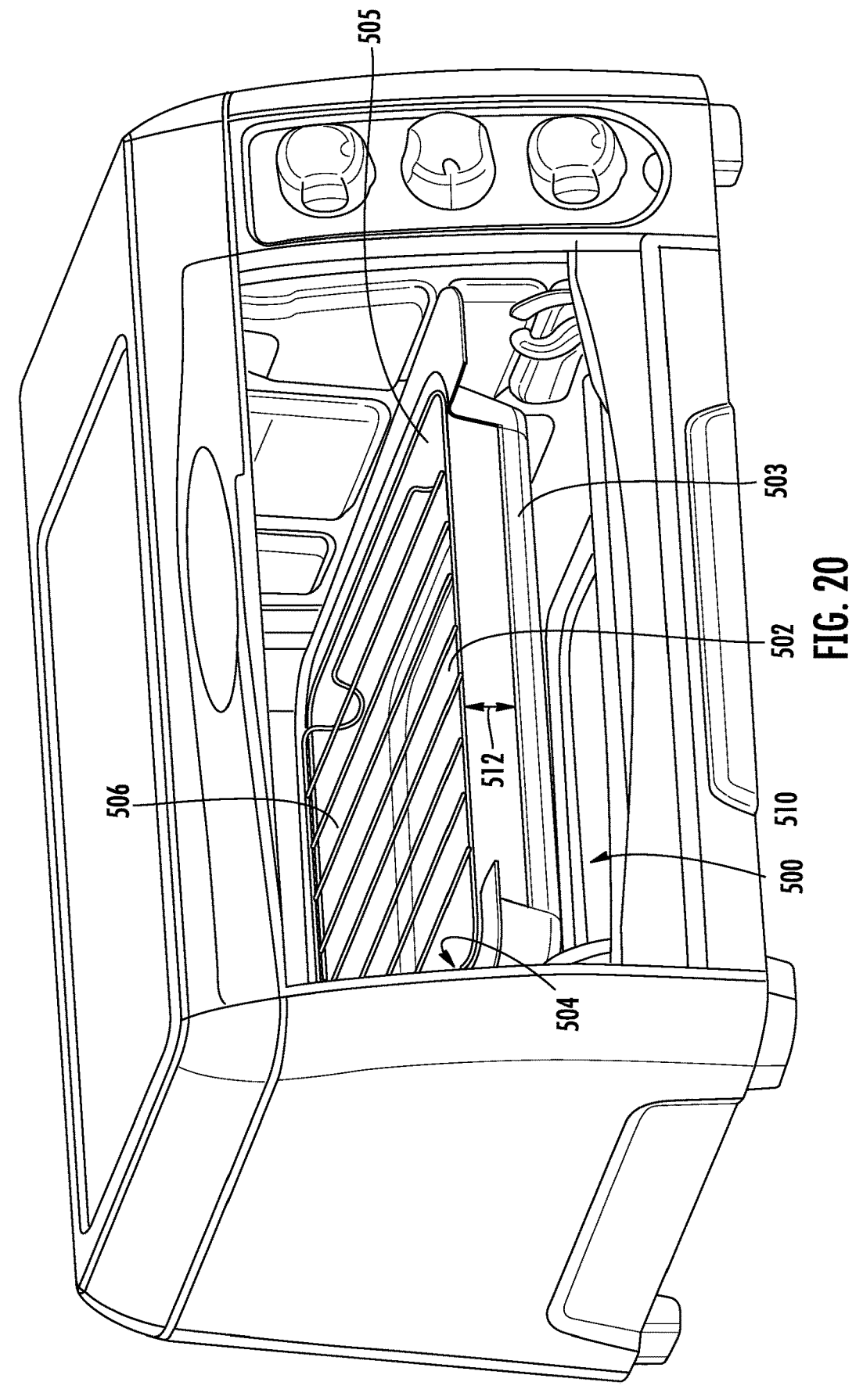
FIG. 20 is a front perspective view of another frying pan and rack for use in a toaster-oven according to further embodiments of the invention.

Another variation of the pan 400 is shown in FIG. 20 and designated at 500. The pan 500 is similar to the pan 400, with a bottom surface 502 and walls 503-506, but the pan 500 lacks the vents in the walls as described above. Instead, the front wall 503 is shorter than the remaining walls 504-506, such that the grill 510 rests above the upper edge of the front wall 503. Air directed from above flows over and around the food, but in particular flows beneath the food and out of the pan 500 through the gap 512 formed by the front wall 503 and the grill 510.

Figure 21:
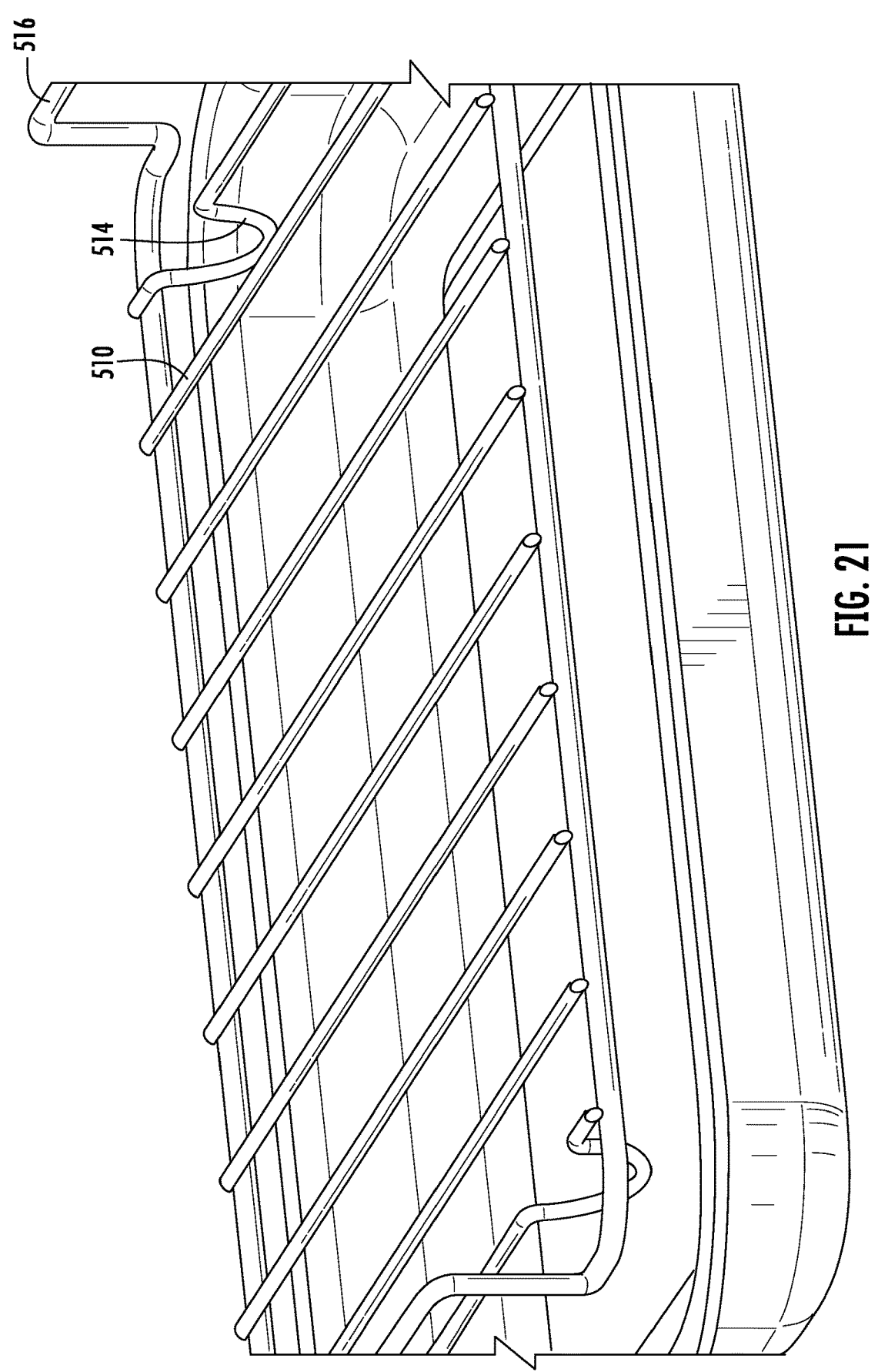
FIG. 21 is an enlarged front perspective view of a grill for a frying pan with different set-offs to enable the grill to be set at different heights according to embodiments of the invention.

Referring now to FIG. 21, it can also be seen that the grill 510 may include projections or "stand-offs" 514, 516 that extend both above and below the cooking surface of the grill 510. Notably, the stand-offs 514 are shorter than the stand-offs 516, which can enable the grill 510 to be spaced at different heights relative to the bottom surface 502 of the pan 500. The different heights may be desired for the cooking of different foods.

Figure 22:
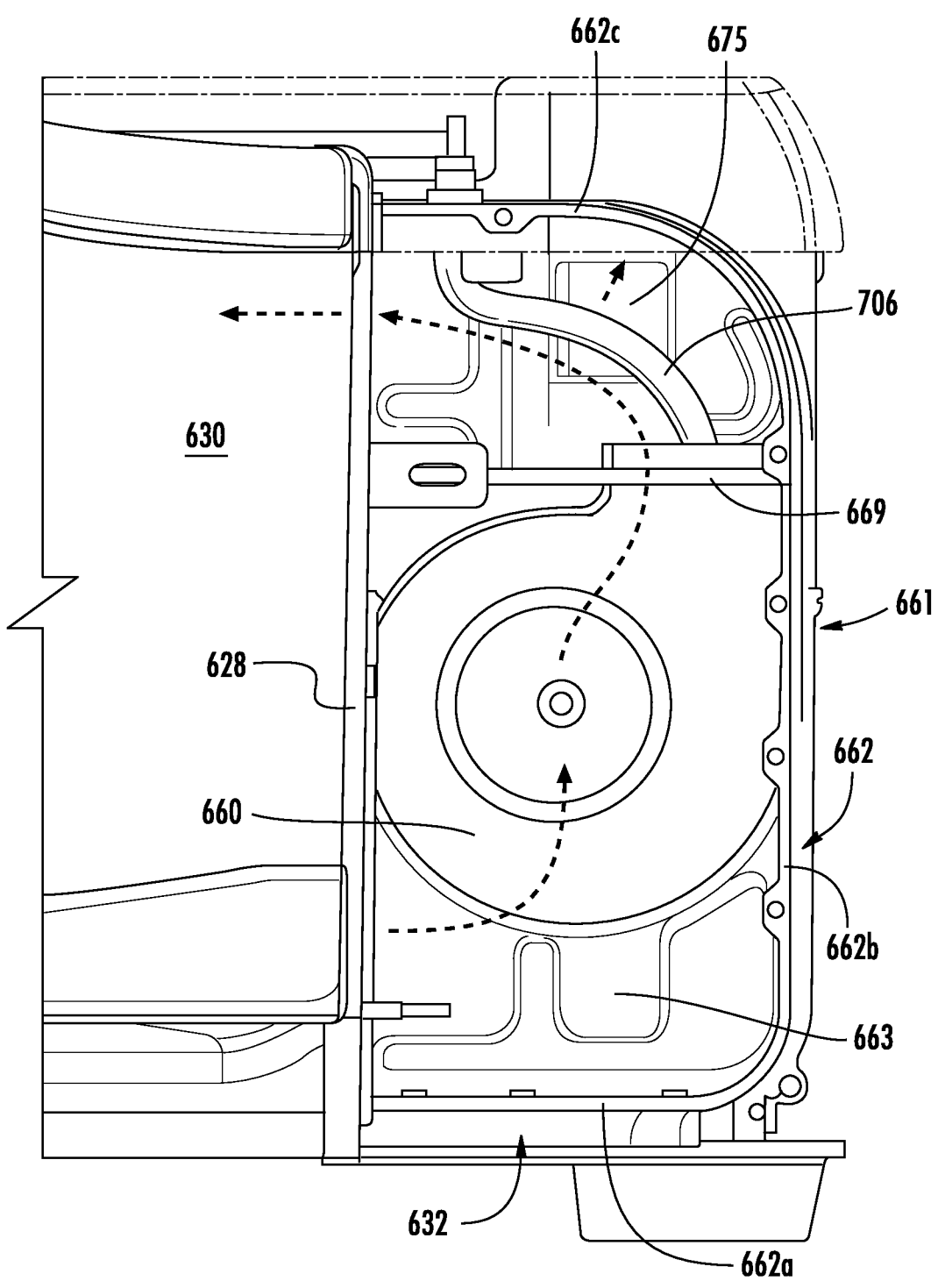
FIG. 22 is a partial cutaway front view of the control cavity of a toaster-oven according to additional embodiments of the invention.
Figure 23:
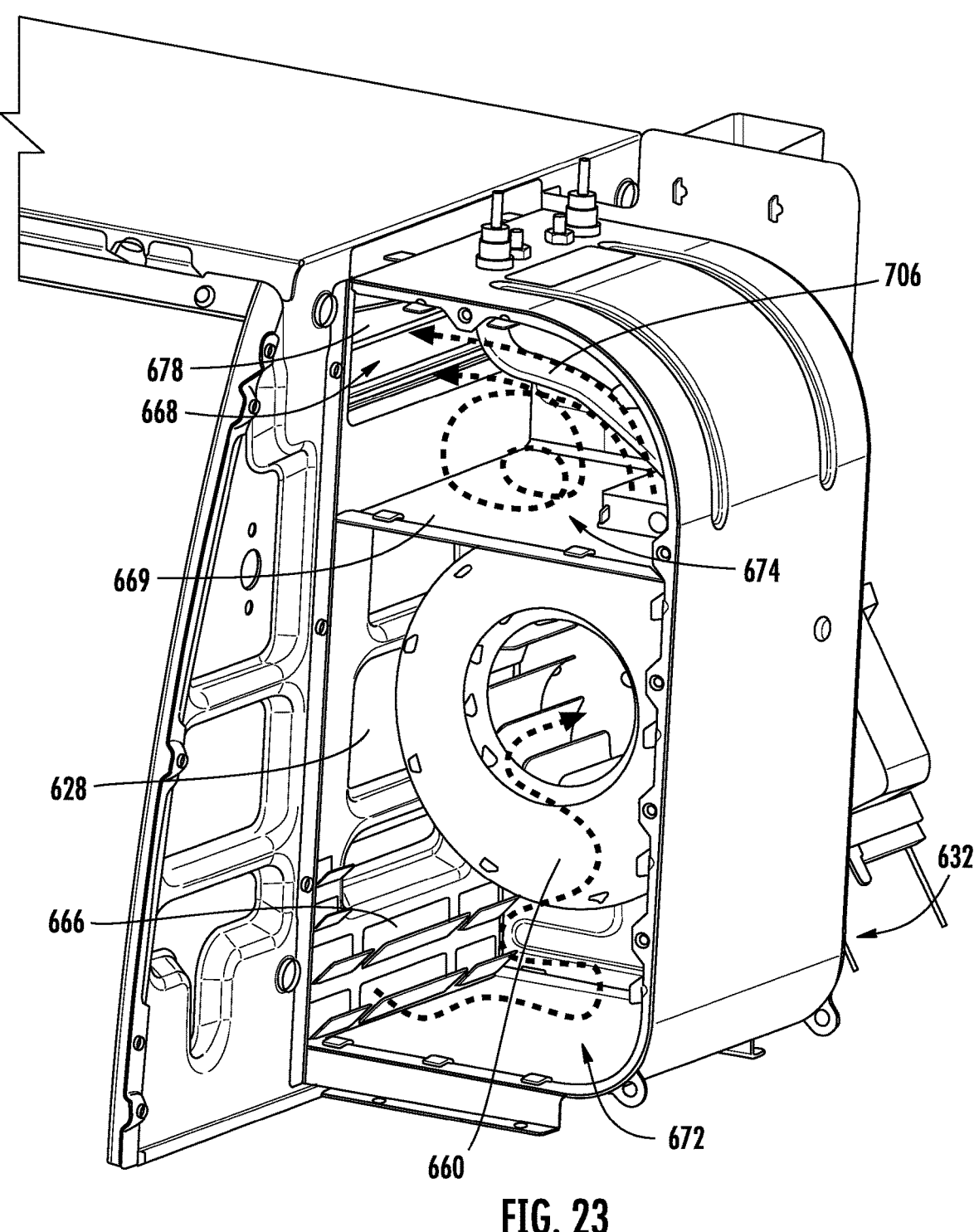
FIG. 23 is a partial cutaway front perspective view of the control cavity of FIG. 22.
Figure 24:
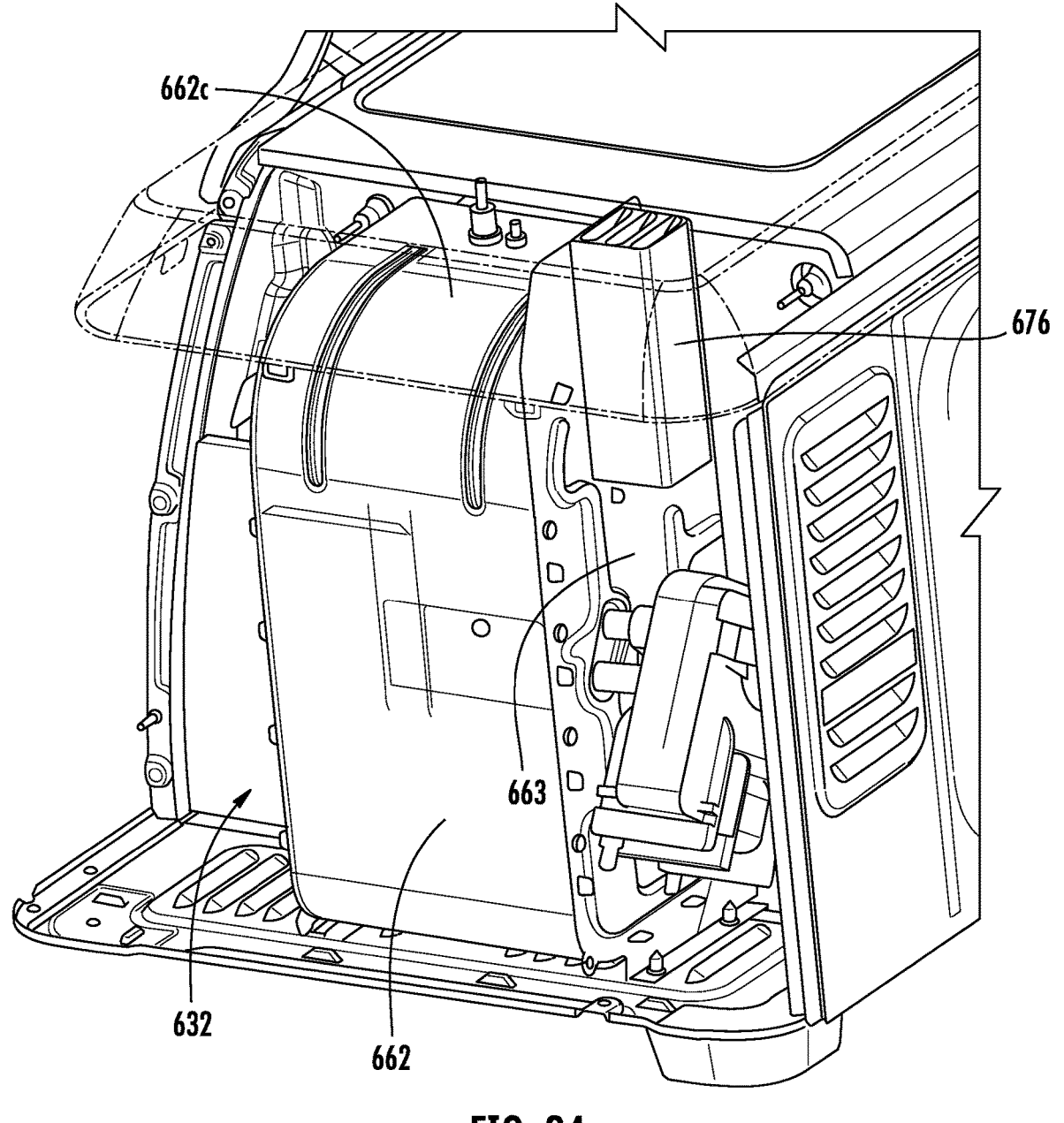
FIG. 24 is a partial cutaway rear perspective view of the control cavity of FIG. 22.

As a further example of alternative embodiments of the invention, a portion of a toaster-oven having a control cavity 632 is shown in FIGS. 22-24. The control cavity 632 employs a recirculation duct 661 that includes an outer shroud 662 with a floor 662a below the lower vents 666, a vertical wall 662b, and a ceiling 662c above the upper vents 668. Side walls 663 (only one side wall 663 is shown herein) meet the front and rear edges of the shroud 662 to form an enclosure with the internal wall 628. A centrifugal fan 660 is mounted within the enclosure. A partition 669 is mounted above the fan 660 to divide the space within the shroud 662 into lower and upper chambers 672, 674. The partition 669 includes an opening 671 that serves as an outlet for the fan 660. A supplemental heating element 706 is mounted in the upper chamber 674 (and, notably, in this embodiment the supplemental heating elements 104 within the cooking cavity described above may be omitted). A duct 676 (see FIG. 24) is mounted to the rear surface of the rear side wall 663 covering a window 675 in the rear side wall 663 and serves as a pathway between the upper chamber 674 and the atmosphere outside of the toaster-oven. Vanes 678 are present on the internal wall 628 to direct air through upper vents 668, and in some instances deflect the air sufficiently to reduce its exit velocity.

As can be seen in FIG. 23, when the toaster-oven is operating in the air frying mode, rotation of the fan 660 (counterclockwise from the vantage point of FIGS. 22 and 23) draws air from the cooking cavity 630 through the lower vents 666 and into the lower chamber 672. The fan 660 draws in this air and expels it through the opening 671 in the partition 669 into the upper chamber 674. From there much of the air exits back into the cooking cavity 630 through the upper vents 668. To reduce humidity in the airstream as described above, some of the air in the upper chamber 674 exits the toaster-oven through the duct 676. Also, the air in the upper chamber 674 is heated by the supplemental heater 706 prior to exiting the upper vents 668. In this embodiment, the total wattage of the toaster-oven in the air fry mode may be about 1,200 W (e.g., each of the 350 W heating elements

100, 102 may be heated to 250 W to avoid "glowing", and the supplemental heating element 706 may provide an additional 185-200 W of heat).

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A multi-functional oven, comprising:
   a housing having a floor, a rear wall, a ceiling, and first and second side walls;
   a door that serves as a front wall of the housing;
   an internal side wall that divides the housing into a cooking cavity and a control cavity;
   a removable cooking rack that defines a cooking surface;
   a lower heating element positioned in a lower region of the cooking cavity beneath the cooking surface;
   an upper heating element positioned in an upper region of the cooking cavity above the cooking surface;
   a fan residing in a recirculation duct, the recirculation duct further comprising a shroud that surrounds the fan, the recirculation duct and the shroud located in the control cavity, the fan configured to draw air from the cooking cavity through one or more lower vents located in a lower area of the internal side wall, thereby creating an airstream below the cooking surface that flows into the lower vents, and to force air from the control cavity through upper vents into the cooking cavity; and
   a recirculation duct vent located in the recirculation duct, the vent including a flapper plate connected to the recirculation duct via a hinge, the flapper plate including a closed position wherein the flapper plate obstructs the recirculation duct vent below a predetermined pressure level and an open position wherein the recirculation duct vent is uncovered above a predetermined pressure magnitude, wherein the flapper plate actuates to the open position from the closed position when the fan operates and maintains the closed position when the fan does not operate.

2. The multi-functional oven defined in claim 1, wherein the fan comprises an air-directing member that rotates about an axis that is generally parallel with the internal side wall.

3. The multi-functional oven defined in claim 1, wherein the recirculation duct directs the air from the lower vents to the fan, and from the fan to the upper vents.

4. The multi-functional oven defined in claim 3, wherein the shroud includes an upper outlet and a lower outlet, each of the upper and lower outlets directing air from the fan into the cooking cavity.

5. The multi-functional oven defined in claim 3, further comprising a duct fluidly connected with the shroud that extends into an upper portion of the cooking cavity, and wherein the upper vents are located in the duct.

6. The multifunctional oven defined in claim 3, wherein the shroud includes a vent into the control cavity, and mounting of the cooking rack in the cooking cavity causes to the vent in the control cavity to open.

7. The multi-functional oven defined in claim 1, wherein the cooking rack includes a heat shield located below the cooking surface, and wherein the heat shield is positioned between the cooking rack and one of the lower heating elements.

8. The multi-functional oven defined in claim 1, further comprising a supplemental heating element.

9. The multi-functional oven defined in claim 8, further comprising a controller operatively connected with the lower heating element, the upper heating element, and the supplemental heating element, and wherein when a first cooking mode is selected, the controller activates the upper and lower heating elements, and wherein when a second cooking mode is selected, the controller activates the upper and lower heating elements and the supplemental heating element.

10. The multi-functional oven defined in claim 9, wherein in the second cooking mode, the controller activates the upper and lower heating elements to operate at less than full heating capacity.

11. The multi-functional oven defined in claim 1, wherein the cooking cavity has a height, a depth and a width, wherein the height is less than at least one of the depth and the width.

12. The multi-functional oven defined in claim 1, wherein the cooking rack and the internal side wall are configured so that mounting of the cooking rack in the cooking cavity engages a switch that enables the fan to operate.

13. The multifunctional oven defined in claim 1, wherein the cooking rack has a first feature, and the internal wall has a second mating feature, wherein engagement of the first and second features ensures that the cooking rack is mounted at the correct height.

14. The multifunctional oven defined in claim 1, wherein operation of the fan induces an airstream of between 15 and 25 cfm.

15. The multifunctional oven defined in claim 1, wherein the cooking cavity has a volume of between 0.5 and 1.5 cubic feet.

16. The multifunctional oven defined in claim 1, further comprising at least one baffle mounted across the cooking cavity from the internal wall.

17. The multifunctional oven defined in claim 1, wherein all of the lower vents are positioned below the cooking surface.

* * * * *